United States Patent
Hill et al.

(10) Patent No.: US 10,180,755 B2
(45) Date of Patent: Jan. 15, 2019

(54) ELECTRONIC DEVICE WITH DYNAMIC THRESHOLDING FOR FORCE DETECTION

(71) Applicant: Apple Inc., Cupertino, CA (US)

(72) Inventors: Matthew D. Hill, Cupertino, CA (US); Rasamy Phouthavong, Cupertino, CA (US); Scott A. Myers, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 15/056,679

(22) Filed: Feb. 29, 2016

(65) Prior Publication Data

US 2017/0249048 A1   Aug. 31, 2017

(51) Int. Cl.
G06F 3/041 (2006.01)
G06F 1/16 (2006.01)

(52) U.S. Cl.
CPC .......... *G06F 3/0418* (2013.01); *G06F 1/1694* (2013.01); *G06F 3/0414* (2013.01)

(58) Field of Classification Search
CPC ..... G06F 3/0418; G06F 3/0414; G06F 1/1694
See application file for complete search history.

(56) References Cited

U.S. PATENT DOCUMENTS

| | | | |
|---|---|---|---|
| 5,748,177 A | 5/1998 | Baker et al. | |
| 5,920,303 A | 7/1999 | Baker et al. | |
| 6,029,214 A | 2/2000 | Dorfman et al. | |
| 6,522,529 B1 * | 2/2003 | Huilgol | G06F 1/1616 248/919 |
| 8,390,481 B2 | 3/2013 | Pance et al. | |
| 8,432,362 B2 | 4/2013 | Cheng et al. | |
| 8,570,280 B2 | 10/2013 | Stewart et al. | |
| 8,654,524 B2 | 2/2014 | Pance et al. | |
| 8,804,347 B2 | 8/2014 | Martisauskas | |
| 8,854,325 B2 | 10/2014 | Byrd et al. | |
| 8,995,117 B1 * | 3/2015 | Hayashida | G06F 1/162 361/679.26 |
| 9,201,105 B2 | 12/2015 | Iida et al. | |
| 2004/0257345 A1 | 12/2004 | Makanae et al. | |

(Continued)

FOREIGN PATENT DOCUMENTS

CN   101071354   11/2007
CN   101482785   7/2009
(Continued)

*Primary Examiner* — Robert J Michaud
(74) *Attorney, Agent, or Firm* — David K. Cole

(57) ABSTRACT

The systems and techniques described herein generally relate to an electronic device having a touch-sensitive surface or region that is configured to receive force-based user input and dynamically adjust a force threshold used to recognize the force-based user input. In particular, the device may include one or more force sensors that are configured to detect a touch that exceeds a dynamically adjustable threshold. In some embodiments, the threshold is dynamically adjusted in response to a detected or estimated stability condition. By dynamically adjusting the threshold, the device may be better adapted or optimized for use with a particular support accessory or support configuration. In some cases, multiple sub-regions may be defined over the touch-sensitive surface, each sub-region having a different force threshold.

18 Claims, 13 Drawing Sheets

(56) References Cited

U.S. PATENT DOCUMENTS

| | | | |
|---|---|---|---|
| 2010/0320341 A1* | 12/2010 | Baumann | B60R 11/0241 |
| | | | 248/206.2 |
| 2011/0169749 A1 | 7/2011 | Ganey et al. | |
| 2012/0068933 A1 | 3/2012 | Larsen | |
| 2013/0002534 A1 | 1/2013 | Braun et al. | |
| 2013/0126325 A1 | 5/2013 | Curtis et al. | |
| 2014/0043289 A1 | 2/2014 | Stern et al. | |
| 2014/0253305 A1* | 9/2014 | Rosenberg | G06F 3/016 |
| | | | 340/407.2 |
| 2016/0098107 A1 | 4/2016 | Morrell et al. | |
| 2016/0103496 A1 | 4/2016 | Degner et al. | |

FOREIGN PATENT DOCUMENTS

| | | |
|---|---|---|
| CN | 101644979 | 2/2010 |
| CN | 102171632 | 8/2011 |
| CN | 103176691 | 6/2013 |
| CN | 203260010 | 10/2013 |
| CN | 103455205 | 12/2013 |
| CN | 103577008 | 2/2014 |
| CN | 104423740 | 3/2015 |
| EP | 0189590 | 6/1986 |
| FR | 2980004 | 3/2013 |
| JP | 2001175415 | 6/2001 |
| WO | WO2007/032949 | 3/2007 |
| WO | WO2014/124173 | 8/2014 |

\* cited by examiner

ELECTRONIC DEVICE WITH DYNAMIC THRESHOLDING FOR FORCE DETECTION

FIELD

The described embodiments relate generally to electronic devices. More particularly, the present embodiments relate to electronic devices that use a dynamic or variable threshold to detect a force input.

BACKGROUND

Many modern electronic devices are configured to receive touch user input. Touch input may be used to initiate an action or control some aspect of the electronic device. Some electronic devices include a touch-sensitive display (e.g., touch screen) that covers a relatively large portion of the electronic device. However, in some instances, the performance of a large-area touch-sensitive display may depend on the rigidity or stability of the device. For example, the force of a touch on the display may, in some instances, cause the device to tip or slide, which may adversely affect the user experience and/or performance of the device.

SUMMARY

The embodiments described herein generally relate to an electronic device having a touch-sensitive surface or region that is configured to receive force-based user input. In particular, the device may include one or more force sensors that are configured to detect a touch that exceeds a predetermined force threshold. The device may be configured to initiate or generate a press-event signal in response to a touch that exceeds the force threshold, which may be interpreted as user input by the device or operating system. In some embodiments, the force threshold is dynamically adjusted in response to a detected or estimated stability condition in order to prevent tipping or undesirable movement of the device. By dynamically adjusting the threshold, touch user input for the device may be optimized for use with a particular mounting accessory or support configuration. In some cases, multiple sub-regions may be defined over the touch-sensitive surface, each sub-region having a different force threshold.

Some example embodiments are directed to a method for setting a force threshold for an electronic device having a touch-sensitive surface. A stability condition of the electronic device may be determined using one or more sensors (e.g., internal sensors). The force threshold may be reduced or modified for at least a portion of the touch-sensitive surface based on the stability condition. A press-event signal may be initiated or generated in response to receiving a touch on the touch-sensitive surface that exceeds the force threshold. In some embodiments, a change in the stability condition of the electronic device is detected and, in response, an updated force threshold is set for the portion of the touch-sensitive surface. The updated force threshold may be based on the detected change in the stability condition.

In some embodiments, the force threshold is dynamically updated based on an estimated change in an orientation of the electronic device. In some cases, the force threshold is dynamically updated based on a bouncing or undesired movement of the device. For example, determining the stability condition may include detecting a movement of at least a portion of the electronic device in response to the touch on the touch-sensitive surface (e.g., partial tipping or sliding). In response, an updated force threshold may be set for the portion of the touch-sensitive surface that is lower than the force threshold.

The estimate or determination of the stability condition may include any one of a variety of techniques. By way of example, estimating the stability condition may include one or more of: determining an orientation of the touch-sensitive surface; determining a support configuration for the electronic device; estimating a friction between the electronic device and a supporting surface of an external object; estimating a friction between a support structure attached to the electronic device and the supporting surface of the external object; estimating a static breaking torque of a pivot joint that is configured to maintain the touch-sensitive surface at a fixed orientation; or estimating a tipping condition using a location of the touch with respect to a pivot axis.

Some example embodiments are directed to an electronic device having a touch sensor configured to estimate a location of a touch on a touch-sensitive surface of the electronic device. The device may also include a force sensor configured to estimate an amount of force applied by the touch. The device may include a processing unit configured to: estimate a stability condition of the touch-sensitive surface, and define a force threshold for the touch-sensitive surface based on the stability condition. In some embodiments, the processing unit is further configured to initiate a press-event signal based a force of the touch and the force threshold.

In some cases, the threshold is a first region-specific threshold. The processing unit may be further configured to; define the first region-specific threshold with respect to a first region of the touch-sensitive surface based, and define a second region-specific threshold with respect to a second region of the touch-sensitive surface that is different than the first region and based, at least in part, on the stability condition.

The initiation or generation of a press-event signal may be dependent on the location of a touch with respect to the two or more regions. In some embodiments, in response to a touch being located in the first region and exceeding the first region-specific threshold, the processing unit may be configured to initiate a press-event signal. In response to the touch being located in the second region and exceeding the second region-specific threshold, the processing unit may be configured to initiate the press-event signal.

In some embodiments, the force threshold is based, at least in part, on a distance between a location of the touch and a location of a pivot point. The first region may be further from the pivot point than the second region. In some cases, the first region-specific threshold is less than the second region-specific threshold.

In some cases, the processing unit is configured to estimate an amount of movement caused in response to the touch on the touch-sensitive surface of the electronic device and, in response to the movement, reduce the force threshold. In some cases, the stability condition is based on an amount of friction between the electronic device and a supporting object.

In some embodiments, the electronic device is configured to attach to a support accessory configured to support the electronic device. The electronic device may also include a proximity sensor that detects a presence of the support accessory. The processing unit may be configured to estimate the stability condition using the proximity sensor. In some cases, the electronic device further comprises a sensor including one or more of: an accelerometer, an inclinometer, a gyrometer, or a magnetometer. The processing unit may be configured to estimate the stability condition using the sensor.

Some example embodiments are directed to an electronic device including an enclosure configured to attach to a support structure to define a pivot. The device may also include a force sensor configured to detect an amount of a force applied to a touch-sensitive surface. The device may also include a processing unit configured to define two or more force thresholds for two or more sub-regions within the touch-sensitive surface. The two or more force thresholds may depend, at least in part, on a distance between a respective sub-region and the pivot.

In some instances, the pivot defines an axis about which the electronic device will rotate when a torque exceeds a static threshold. In some cases, an input having a force at or below a respective threshold for the two or more force thresholds in a respective sub-region will not cause the electronic device to rotate about the axis.

In some embodiments, the support structure is supported by a surface of an external object. The two or more thresholds may be based, at least in part, on an estimated amount of friction between the support structure and the surface. In some embodiments, the support structure is an inclined support stand configured to rest on a surface of an external object. The pivot may be formed or defined along an edge between the support structure and the surface.

In some embodiments, the support structure is a support stand; the pivot is a hinged pivot within the support structure; and the hinged pivot is configured to remain immobile in response to a touch that is less than or equal to a respective force threshold of the two or more force thresholds applied to a respective sub-region. In some embodiments, the hinged pivot is a ball-joint pivot configured to rotate about multiple axes. The two or more thresholds may vary across both a length of the touch-sensitive surface and a width of the touch-sensitive surface.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
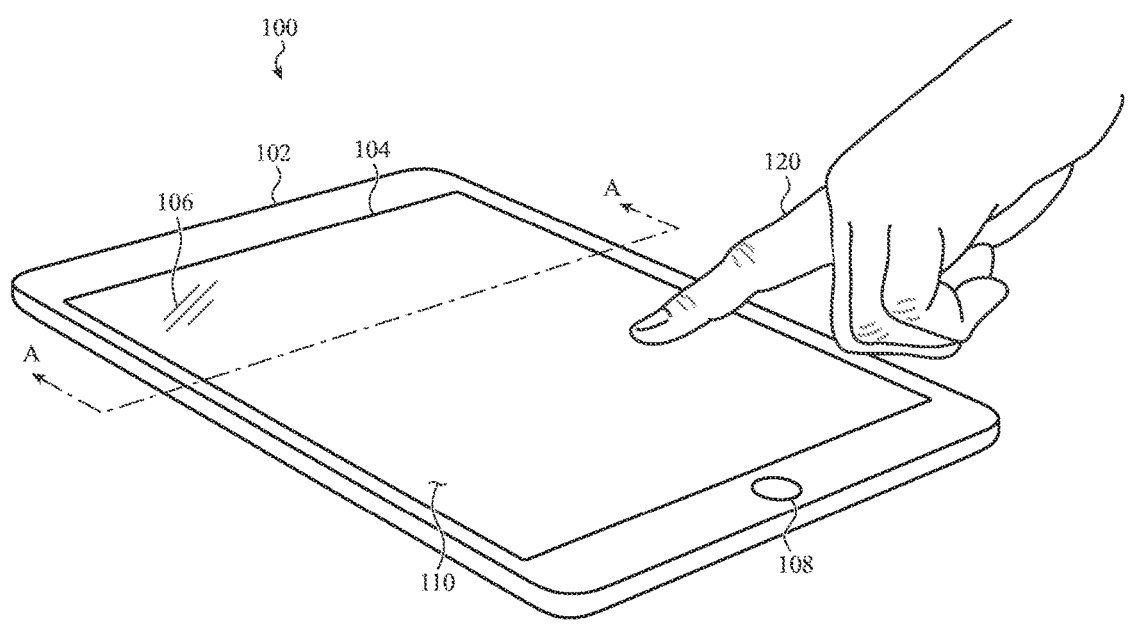
FIG. 1 depicts an example electronic device having a touch-sensitive surface.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following embodiments are directed to systems and techniques of providing a variable or dynamic force-detection threshold for an electronic device that is configured to prevent undesirable tipping or movement of the device during normal user interaction. Some example devices include a force sensor coupled to a force-sensitive or touch-sensitive surface that is configured to receive user touch and/or force input. The force sensor may be configured to detect an applied force and initiate a press-event signal in response to a touch on the surface that exceeds a force threshold. The press-event signal may be interpreted as user input by the device or operating system and may correspond to button push, a user selection of an object or other user-initiated command.

Generally, the force threshold may be defined or set with respect to one or more force sensors incorporated into the device. The force sensor may be integrated or operatively coupled to a cover glass sheet or other component that defines an exterior surface of the electronic device, and may be configured to produce a variable or scaled output that corresponds to an amount of force applied to the exterior surface of the electronic device. An applied force that is greater than the force threshold may trigger a press-event or force-event signal which may be used alone or in conjunction with other input to control the electronic device. For example, the output of the force sensor may be used in conjunction with a location output of a touch sensor, such as a capacitive array of a touch screen, to interpret touch user input for a graphical user interface.

The amount of threshold that is used to initiate a force- or press-event may vary depending on a current mounting or support configuration of the electronic device. In some embodiments, the force threshold may be dynamically adjusted based on an estimated stability condition. In general, a stability condition may include a mounting configuration, device orientation, physical constraint, environmental condition, or other factor that may affect the stability of a touch-sensitive surface when receiving touch and/or force input. A stability condition may be estimated by measuring various measurements including, for example, a measurement of an angle or orientation of the device, an estimation of friction between the device and a supporting surface, an estimation of a static breaking force of a pivot joint, an estimation of a tipping condition, a detection of the presence of a particular support structure or support accessory, and so on.

By way of example, an electronic device, such as a tablet device may include a touch screen that is configured to receive touch and/or force input. In accordance with some embodiments, the tablet device may be configured to detect that it is being used in an inclined or upright orientation that is consistent with use of an inclined stand or support structure. In such a condition, excessive force on the touch screen of the tablet may cause the device to tip or slide. In response to determining that the stability condition (e.g., attachment of a stand or support structure) is one that is prone to tipping or sliding, the force threshold may be dynamically reduced or adjusted to help prevent movement of the device during normal touch interactions with the touch screen. The reduction in the force threshold may reduce the pressure or force required in order to trigger a press-event signal used for certain user input commands.

A stability condition, such as an orientation or placement of the device, may be detected using one or more internal sensors, the output of which may be used to determine or adjust the dynamic force threshold. For example, one or more internal sensors may be used to estimate conditions that are consistent with a particular mounting configuration. More specifically, one or more internal sensors may be used to detect a sustained orientation or position that is consistent with an incline angle associated with a particular support accessory, such as a stand. In some cases, an estimated stability condition may be based on the detection of an attachment or proximity of a particular support accessory. The force threshold may be dynamically adjusted in accordance with the estimated stability condition to reduce the likelihood that the device will become unstable due to normal touch input.

In accordance with some embodiments, multiple region-specific force thresholds may be defined over the touch-sensitive surface in accordance with a particular stability condition or mounting configuration. Some mounting or support configurations may define a pivot point or pivot axis about which the device may rotate if subjected to a sufficient torque. In such cases, the distance of a touch from the pivot point or pivot axis may be used to determine or adjust the dynamic force threshold. By way of example, a region that is further from a pivot point or pivot axis may have a region-specific threshold that is lower or reduced as compared to a region that is closer to a pivot point or pivot axis. Additionally or alternatively, region-specific thresholds may be adjusted or tailored to account for a potential translational slip or shift due to a frictional interface between two components or a component and a supporting object, such as a table top. An individual or unique force threshold may be assigned to each respective sub-regions that are defined for a particular mounting or support configuration.

These and other embodiments are discussed below with reference to FIGS. 1-13 described below. However, those skilled in the art will readily appreciate that the detailed description given herein with respect to these Figures is for explanatory purposes only and should not be construed as limiting.

FIG. 1 depicts an example electronic device having a touch-sensitive surface that is configured to receive force-input from a user. By way of example, the device 100 may include an enclosure 102 surrounding a display 104 that is positioned below a touch-sensitive surface 110 or touch-sensitive region. The touch-sensitive surface 110 may be defined over a portion of the cover sheet 106 and/or other element that forms a portion of an external surface of the device 100. One or more force sensors and/or touch sensors may be operatively coupled to the touch-sensitive surface 110 and configured to receive touch input from an object, such as a user's finger 120.

The device 100 may be configured to initiate or generate a force- or press-event signal in response to a touch on the touch-sensitive surface 110 that exceeds a force threshold. The force- or press-event signal may be interpreted as user input and used to control aspects of the device. For example, the device 100 may initiate or generate a press-event signal in response to a press by a finger 120 that exceeds a force threshold and, in response, recognize a user-selection of an object depicted on the display 104. In some implementations, multiple force thresholds may be defined, each corresponding to a different type of user input. For example, a first force threshold may be associated with first operation (e.g., an object selection). A second force threshold, greater than the first force threshold, may be associated with a second operation (e.g., view a preview or drill-down operation) that is different than the first operation. In some embodiments, the device 100 may be configured to use a touch sensor in addition to, or in conjunction with, the one or more force sensors to interpret a wide range of user input commands including, for example, cursor movement, object selection, touch gestures, and other forms of user input.

As described with respect to various embodiments described herein, the force threshold may be dynamically adjustable based on a detected or estimated stability condition, which may correspond to a particular mounting or support configuration of the device 100. The stability condition or support configuration may be detected using one or more internal sensors, user input, or other type of signal or data. In one example, the force threshold may be set to a maximum or nominal state when it is estimated that the device 100 is placed flat on a surface or held in the user's hands. The force threshold may be lowered or reduced in response to an estimated stability condition. For example, the force threshold may be lowered if it is estimated that the device is placed in an elevated or tilted configuration that may be prone to tipping or sliding. Various example mounting or support configurations are described below with respect to FIGS. 3-8.

FIG. 1 depicts a non-limiting example of an electronic device 100 in accordance with some embodiments. In particular, the electronic device 100 is depicted as a tablet computing device. In other examples, the electronic device 100 may include a variety of portable electronic devices including, without limitation, a mobile phone, a portable media player, or other similar devices. The embodiments described herein may also be used in conjunction with a variety of other types of devices including, for example, a notebook computer, a computer display device, a desktop computer, an electronic appliance, and so on. The embodiments may also be used in conjunction with a wearable electronic device, such as a smart watch, timekeeping device, health monitoring device, and other similar devices.

With regard to FIG. 1, the device 100 includes an enclosure 102 that defines an opening in a front or upper portion of the device 100. The display 104 may be at least partially disposed within the opening of the enclosure 102 and be surrounded by a bezel or border region of the enclosure 102. In some examples, the display 104 forms nearly the entire front or upper portion of the device without a bezel or border region. A transparent cover sheet 106 may be disposed over the display 104 to form an exterior or external surface of the device 100. The cover sheet 106 may be formed from a translucent material such at plastic, glass, sapphire, zirconia or the like.

The cover sheet 106 and touch sensor (depicted in FIG. 2) may define the touch-sensitive surface 110 on the upper or front surface of the device 100. In this example, the touch-sensitive surface 110 is substantially congruent with a display area of the display 104. In general, the touch-sensitive surface 110 together with the display 104 may be referred to as a touch screen or touch-sensitive display.

As described in more detail below with respect to FIG. 2, the touch-sensitive surface 110 may be operably coupled to one more force sensors and/or touch sensors that are configured to sense touch input from a user. In accordance with the embodiments described herein, the force threshold used to interpret the touch or force input on the touch-sensitive surface 110 may be dynamically adjusted based on an orientation and/or mounting or support configuration of the device 100.

As shown in FIG. 1, the device 100 may also include one or more additional user-input devices, such as a button 108. In some embodiments, the button 108 may also include one or more force sensors that are configured to initiate a press-event signal in response to a touch that exceeds a threshold. In accordance with some embodiments, the threshold for the button 108 may also be dynamically adjusted based on stability condition associated with an orientation and/or mounting configuration. Alternatively, the button 108 may include a mechanical switch, such as a dome switch having a substantially fixed or non-adjustable force threshold. While the example of FIG. 1 is provided as one illustrative embodiment, variations in the configuration or specific layout of the components of the device 100 may vary.

Figure 2:
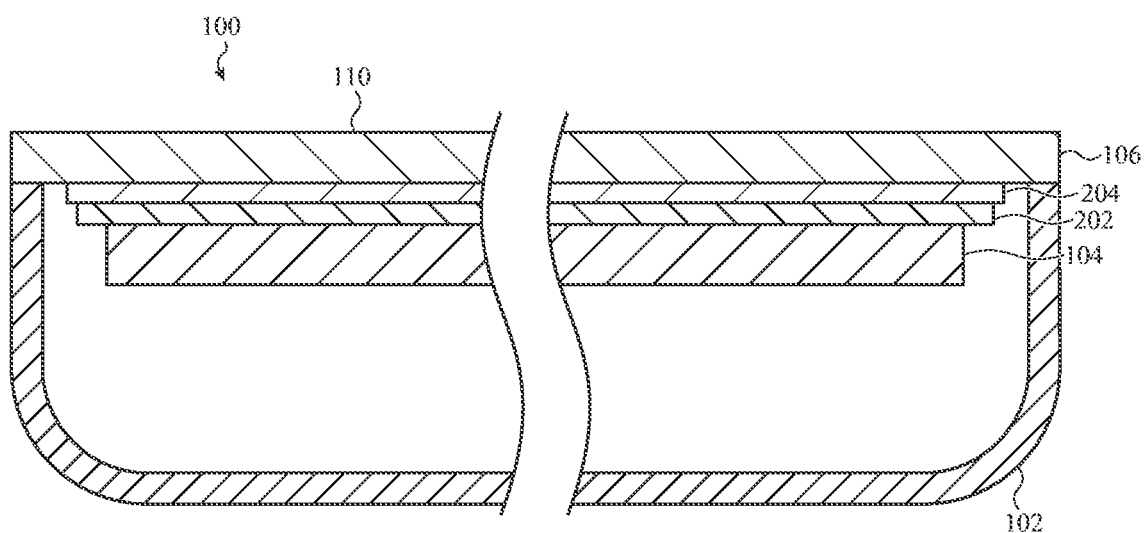
FIG. 2 depicts a cross-sectional view of the electronic device of FIG. 1 viewed along section A-A of FIG. 1.
Figure 13:
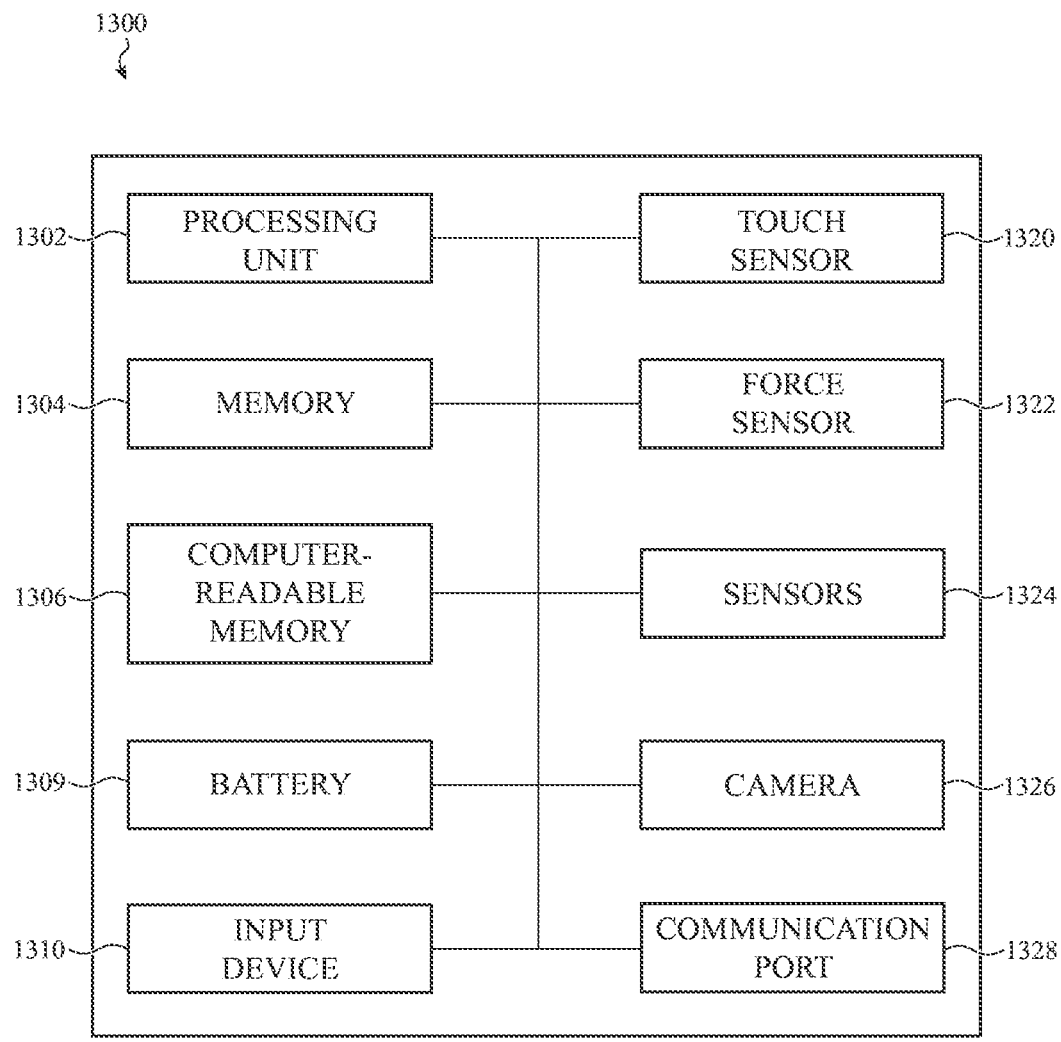
FIG. 13 depicts example components of an electronic device.

FIG. 2 depicts a cross-sectional view of the electronic device of FIG. 1 viewed along section A-A. The cross-sectional view of FIG. 2 illustrates the various components that may be used to form the touch sensitive surface 110 of the device 100. Many internal components, such as a processing unit, computer memory, battery, and other components of the device 100 are omitted from FIG. 2 for clarity. FIG. 13, described below, provides another non-limiting example of internal components of an electronic device which may be included in the device 100 of FIGS. 1 and 2.

As shown in FIG. 2, the device 100 includes a cover sheet 106 that forms at least a portion of the external or exterior surface of the electronic device. The cover sheet 106 may be attached directly to the enclosure 102 or may be attached via a gasket, seal, or other coupling component. As described above, the cover sheet 106 (or cover) may be formed from a translucent material such as a polyethylene terephthalate (PET), amorphous glass, or crystalline ceramic, such as sapphire or zirconia.

In the example of FIG. 2, a touch sensor 204 is positioned below the cover sheet 106. The touch sensor 204 may include an array of capacitive electrodes that is configured to detect the location of a touch on the touch-sensitive surface 110 of the device 100. The touch sensor 204 may operate in accordance with a mutually-capacitive, self-capacitive, or other type of capacitive sensing scheme. In some embodiments, the touch sensor 204 may include a resistive, inductive, ultrasonic, or other type of sensor configured to detect the presence and location of a touch on the touch-sensitive surface 110.

As shown in FIG. 2, a force sensor 202 is also positioned below the cover sheet 106. While in this example the force sensor 202 is depicted as being disposed below the touch sensor 204, the order and position of the layers may vary depending on the implementation. The force sensor 202 may operate in accordance with various force-sensing schemes or configurations. For purposes of illustration, the force sensor 202 is depicted as a single layer within the display stack. However, the force sensor 202 may include multiple layers positioned in various locations within the display stack. Additionally or alternatively, the force sensor 202 may be formed around the periphery or around a region of the display 104. The force sensor 202 may also be integrally formed with a seal or gasket that is positioned between the cover sheet 106 and the enclosure 102.

In one embodiment, the force sensor 202 is formed from one or more strain-sensitive layers that are configured to produce an electrical output or exhibit a change in an electrical property in accordance with an amount of strain or deflection of the cover sheet 106. For example, the force sensor 202 may include a piezo-electric or piezo-resistive material that produces a charge or exhibits a change in resistance in response to a deflection of the cover sheet 106. The amount of force of a touch on the touch-sensitive surface 110 may correspond to the amount of deflection of the cover sheet 106 and/or the force sensor 202.

In another embodiment, the force sensor 202 may include a capacitive sensor that includes a pair of capacitive electrodes positioned on opposite sides of a compressible layer or air gap. An amount of force may be detected by measuring deflection of the compressible layer or air gap using a change in capacitance between the pair of capacitive electrodes. The capacitive sensor may be positioned within a single layer, as depicted in FIG. 2. Additionally or alternatively, a capacitive force sensor may be positioned along one or more edges of the display 104 or may be located between the cover sheet 106 and the enclosure 102.

While in FIG. 2, the force sensor 202 is depicted as being integrated with the display stack, in some embodiments a force sensor may be integrated with an object, such as a stylus, that is configured to interact with the display stack or another surface of the device 100. For example, a pressure-sensitive force sensor may be operatively coupled to the tip of a stylus and used to determine the force applied by the stylus to an external surface of the device 100. Such a force sensor may replace the example force sensor 202 of FIG. 2 or may be used in conjunction with the force sensor 202.

As shown in FIG. 2, the display 104 is also positioned below the cover sheet 106 and may be at least partially positioned within the opening defined by the enclosure 102. The display 104 may include any one of a variety of display technologies including, for example, an liquid crystal display (LCD), organic light emitting diode (OLED) display, electroluminescent (EL) display, and so on. While depicted as separate and distinct components in the example of FIG. 2, in some embodiments, one or more of the force sensor 202 and/or the touch sensor 204 may be integrally formed with the display 104.

Whether integrated into the device 100 or other object, such as a stylus, the force sensor 202 may be configured to generate an electrical output that may be used to initiate a force-event signal or press-event signal. The force- or press-event signal may be interpreted as user input to control various aspects of the device. The output from the force sensor 202 may be used alone or in conjunction with the output of the touch sensor 204 to interpret a wide variety of user input on the touch-sensitive surface 110.

As discussed previously, the device may be configured to dynamically adjust one or more thresholds associated with the force sensor 204 depending on a stability condition which may correlate to a mounting or support configuration of the device. For example, the force threshold may be dynamically reduced when the device is being used in conjunction with a particular support accessory or estimated to have a support configuration that is prone to tipping or otherwise having a reduced or impaired stability.

Figure 3:
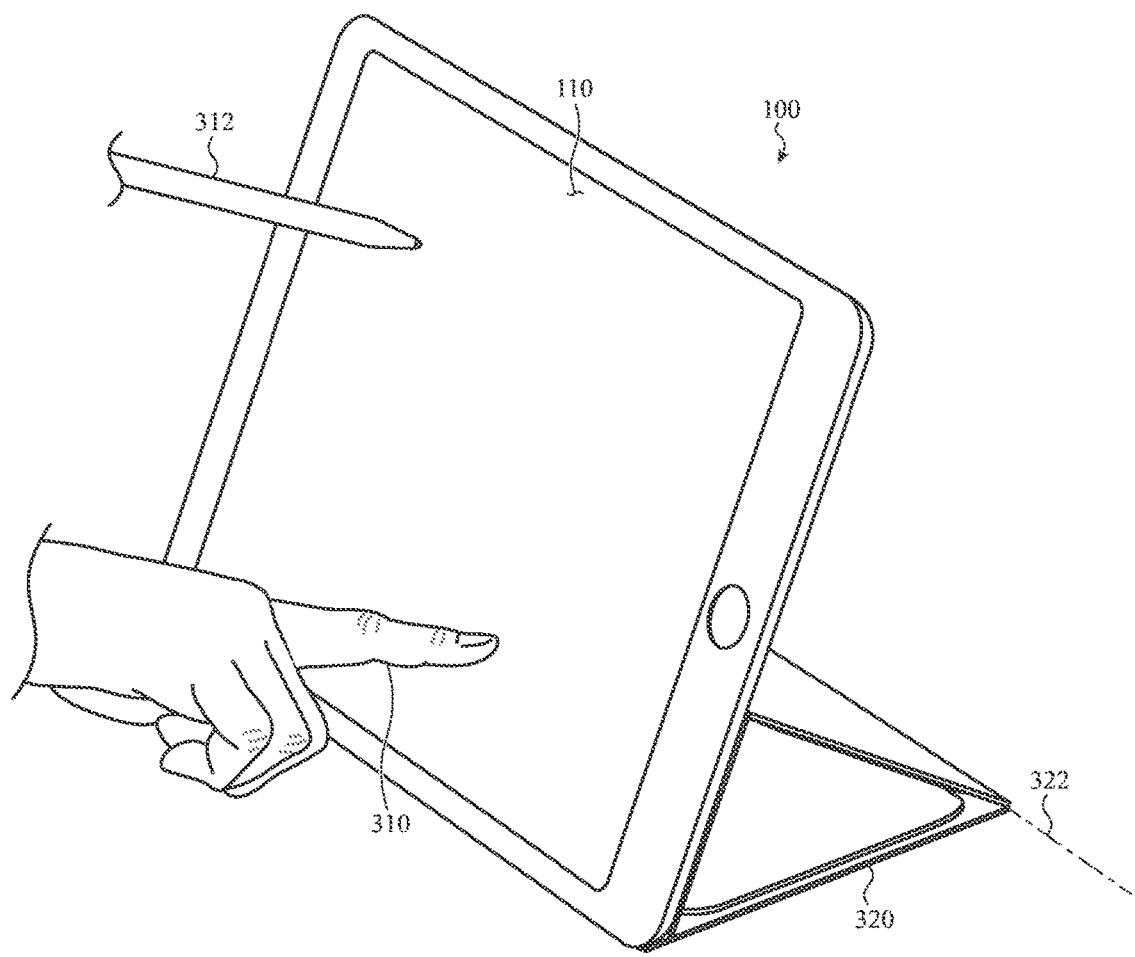
FIG. 3 depicts an example electronic device and an example mounting configuration.

FIG. 3 depicts an example tablet computing system having an example support accessory. In the non-limiting example of FIG. 3, the device is attached a support stand 320 that is configured to support the device 100 in an inclined or upright position. The support stand 320 may be configured to rest on a support surface of an external object, such as a table or desk.

In the present non-limiting example, the support stand 320 is formed from a magnetic cover accessory that is configured to fold into the support configuration depicted in FIG. 3. In particular, the support stand 320 includes multiple segments that are flexibly coupled together by respective hinges or flexible portions. The support stand 320 may be reconfigurable to provide both a protective cover and support stand functionalities. In a first configuration, the support stand 320 may be configured to be flattened into a cover configuration such that each of the multiple segments lies flat across the touch-sensitive surface 110 of the device 100. This may help prevent the touch-sensitive surface 110 from receiving accidental touch input and protect the cover sheet and display. In a second configuration, the segments of the support stand 320 may be folded to provide a support stand, as depicted in FIG. 3. The segments of the support stand 320 may include magnetic elements that are configured to couple to the exterior surface of the device 100 and may help to hold the support stand 320 in the first and/or second configuration.

As shown in FIG. 3, the device 100 may be configured to receive touch input on the touch-sensitive surface 110. An object, such as a user's finger 310 or a stylus 312, may be used to provide touch input to the touch-sensitive surface 110. As described above with respect to FIG. 2 above, the touch-sensitive surface 110 may be operatively coupled to a touch sensor that is configured to detect the location of a touch on the surface. The touch-sensitive surface 110 may also be operatively coupled to a force sensor that is configured to produce a variable or scaled output that corresponds to the force of a touch exerted by the user's finger 310 and/or the stylus 312. As discussed above with respect to FIG. 2, one or more force sensors may be integrated within the touch-sensitive surface 110 of the device 100, integrated with the stylus 312, or a combination of the two.

In the present example, the support stand 320 defines a pivot axis 322 about which the device 100 will rotate or tip if excessive force is applied to the touch-sensitive surface 110. The pivot axis 322 is defined along an interface between the rear edge of the support stand 320 and the supporting surface of an external object, such as a table or desk. Typically, the device 100 and the support stand 320 will remain stable unless a torque that exceeds a static limit is exerted on the device 100, which may be the result of an excessive force from the user's finger 310 or another object such as the stylus 312.

In some embodiments, a force threshold, used to trigger a press-event signal or otherwise recognize force input, may be dynamically adjusted based on a detected or estimated stability condition or support configuration. In particular, the device 100 may be configured to detect a stability condition or mounting configuration based on one or more internal sensors and/or other signals or data and, in response, dynamically adjust the force threshold.

In one example, the force threshold may be reduced for the entire touch-sensitive surface 110 based on an estimated maximum force that can be applied without impairing the stability of the device 100. The maximum force may be determined based on a stability condition associated with a particular mounting or support configuration that is detected by the device. For example, the device 100 may be configured to detect an inclined stand-type mounting configuration using an internal orientation sensor, such as an accelerometer, an inclinometer, a tilt sensor, or other similar device. In one embodiment, the device 100 is configured to determine the support configuration if, for example, the orientation of the device has remained at a fixed angle for a particular period of time. In some cases, if the device is positioned at a non-changing or relatively fixed angle for a sustained period of time (e.g., longer than several seconds) and the angle corresponds to an incline angle associated with the support stand 320, the device 100 may determine that the device 100 is attached to and supported by the support stand 320. In some cases, the device 100 may estimate a stability condition by simply measuring or estimating the fixed angle, which may correspond to the incline angle associated with the support stand 320.

Additionally or alternatively, the device 100 may be configured to directly detect the presence of the support stand 320 in order to determine a stability condition. In one embodiment, the support stand 320 includes a magnet, electrical contact, or other identifiable element that may be sensed by the device 100 and used to determine the presence of the support stand 320. The device 100 may also be configured to receive an electrical signal from the support stand 320 that can be used to detect its presence and/or configuration. In some embodiments, the device 100 may be configured to receive a user selection or user input that indicates that the support stand 320 is attached to the device 100.

Figure 4:
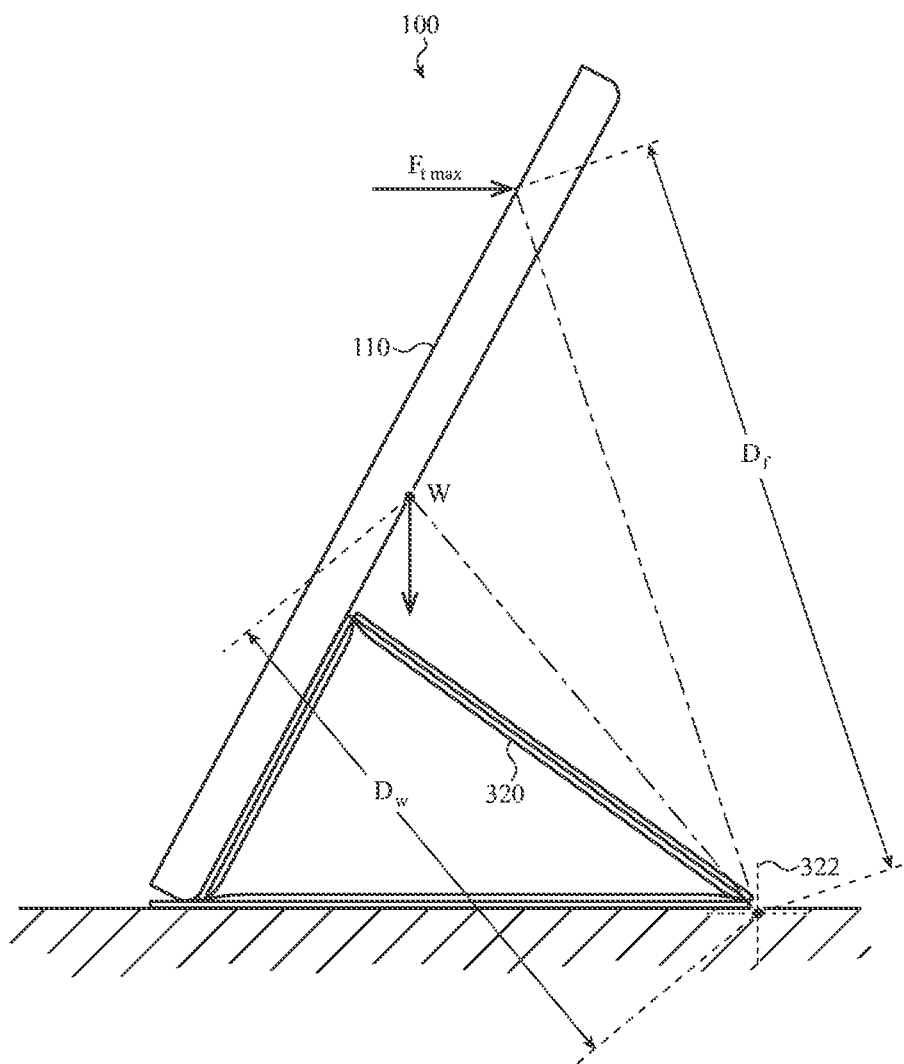
FIG. 4 depicts a free-body diagram of the electronic device and mounting configuration of FIG. 3.

In response to a determination that the support stand 320 is attached to the device 100 or an estimation that the device 100 has a stability condition consistent with an inclined and externally-supported support configuration, the device may be configured to adjust the dynamic force threshold used to recognize force-based touch events. FIG. 4 depicts an example free-body diagram of the electronic device 100 and support stand 320 of FIG. 3 having a force applied at a location of the touch-sensitive surface 110.

With reference to FIG. 4, the device 100 may be configured to determine a maximum force $F_{t\ max}$ that can be applied to the touch-sensitive surface 110 without exceeding a static limit. For example, an applied force that exceeds $F_{t\ max}$ may cause the device 100 (and support stand 320) to tip or rotate about the pivot axis 322. This calculation may be based on the amount of force of a touch $F_{t\ max}$ that causes a user-input torque that exceeds the static torque defined, in part, by the center of gravity of the device. A sample estimation may be based on the following relationship:

$$F_{t\ max} = \frac{W \times D_w}{D_f}, \qquad \text{Equation 1}$$

where $F_{t\ max}$ is the maximum force that can be applied without tipping, $D_f$ is the distance from the location of the touch to the pivot axis 322, W is the weight of the device, and $D_w$ is the distance from the center of gravity of the device 100 to the pivot axis 322. Alternatively, $D_f$ may be defined as the distance from the upper-most edge of the touch-sensitive surface 110 to the pivot axis 322. Formally, the value $F_{t\ max}$ represents the component of the touch force that is perpendicular to a hypothetical line that extends from the point of touch on the touch-sensitive surface 110 and the axis 322. However, if the device 100 is nearly vertical, as shown in FIG. 4, the value $F_{t\ max}$ may be sufficiently approximated as the amount of force applied to the touch-sensitive surface 110.

Using the relationship expressed in Equation 1, or a similar technique, the force threshold of the device 100 may be adjusted to a value such that a touch having a force less than or equal to $F_{t\ max}$ may be used to trigger or initiate a force-event signal or press-event signal. In some cases, multiple force thresholds may be defined, each force threshold associated with a different operation or set of operations. For example, a first threshold may be associated with a selection operation and a second, higher threshold may be associated with a preview or drill-down operation. As a result, normal touch or force input on the touch-sensitive surface 110 may not cause the device to tip or rotate about the axis 322.

In another example, the force threshold may be reduced for a portion or sub-region of the touch-sensitive surface 110 based on an estimated maximum torque. Similar to the example described above, the device 100 may be configured to determine or estimate a support configuration associated with the attachment of the support stand 320 and the pivot axis 322. The device 100 may be further configured to define multiple sub-regions within the touch-sensitive surface 110, each sub-region having a different region-specific threshold. Also similar to the example discussed above, each region-specific threshold may be determined based on a force that is estimated to overcome the static weight of the device 100 and cause rotation about the axis 322. A sample estimation for a maximum force $F_{region\ max}$ for each sub-region may be based on the following relationship:

$$F_{region\ max} = \frac{W \times D_w}{D_{region}}, \qquad \text{Equation 2}$$

where $F_{region\ max}$ is the maximum force that can be applied without tipping, $D_{region}$ is the distance from the top of the region to the pivot axis 322, W is the weight of the device, and $D_w$ is the distance from the center of gravity of the device 100 to the pivot axis 322.

Using the relationship expressed in Equation 2, or a similar technique, the force threshold (or group of force thresholds) of each region may be dynamically adjusted to a value such that a touch having a force less than or equal to $F_{region\ max}$ may be used to initiate or generate a force-event signal or press-event signal. One advantage to using this approach is that a greater force can be used for regions that are closer to the pivot axis 322 because it is more difficult to tip the device when pushing on a lower portion of the screen. Example sub-regions that may be used in accordance with this technique are described below with respect to FIGS. 9-11.

In another example, the force threshold may be reduced for all or a portion of the touch-sensitive surface 110 based on an estimated maximum friction. In particular, the force threshold may be determined based on an estimated amount of force required to push the device 100 (and support stand 320) across a supporting surface, such as a table top. Similar to the previous examples, the device 100 may be configured to estimate a mounting configuration based on one or more sensors or other input.

In addition, the device 100 may be configured to detect one or more properties of the mounting surface and estimate a maximum force based on an estimated friction. In one example, the device 100 is configured to use an optical sensor, such as the onboard camera or other optical device, to determine the type of surface that is under the support stand 320 supporting the device 100. Based on the optical properties, such as a specular or diffuse reflection property, the device 100 may be configured to estimate the friction between the support stand 320 and the surface. The device 100 may also be configured to detect the type of material (e.g., wood, metal, laminate countertop) using an optical sensor and an analysis of the surface texture and/or color of the surface. The device 100 may be configured to use one or more other types of sensors, such as acoustic sensors (e.g., a speaker and/or microphone) to determine properties of the surface in order to estimate the friction.

Additionally or alternatively to the techniques described above, the device 100 may be configured to use a default or fixed frictional estimate to determine the dynamic force threshold. In general, the dynamic threshold may be adjusted based on the following relationship:

$$F_{friction\ max} = \mu \times W, \qquad \text{Equation 3}$$

where $F_{friction\ max}$ is the maximum force that can be applied without causing the device to slide, $\mu$ is the estimated friction between the support stand 320 and the supporting surface, and W is the weight of the device. Using the relationship expressed in Equation 3, or a similar technique, the force threshold of the device 100 may be adjusted to a value such that a touch having a force less than or equal to $F_{friction\ max}$ may be used to initiate or generate a force-event signal or press-event signal.

The frictional force limit described with respect to Equation 3 may be implemented in conjunction with the one or both of the tipping limits described with respect to Equations 1 and 2. For example, in some implementations, both a theoretical tipping limit and a frictional limit may be computed or estimated using one of the above-described techniques. A dynamic force threshold may be defined based on the lesser of the tipping limit (e.g., $F_{t\ max}$ or $F_{region\ max}$) and the frictional limit (e.g., $F_{friction\ max}$). Alternatively, both the tipping and frictional limit may be modeled as a single function or modeling relationship. Regardless of the underlying model or relationship, the dynamic threshold may be computed or estimated using a simplified mathematical equation, look-up table, or other similar implementation.

The dynamic force threshold may depend, in part, on the location of the touch, which may determine if a tipping limit or a frictional limit dominates. For example, a touch located closer to the pivot axis 322 may be dominated by a frictional limit as an excessive force may tend to cause the device to translate or slip. In contrast, a touch located further from the pivot axis 322 may be dominated by a tipping limit as an excessive force may cause the device to tip or rotate rather than slip. In some implementations, a transition line or region may be defined with respect to the touch-sensitive surface 110 at which the device transitions from a tipping limit to a frictional limit (or frictional limit to tipping limit) in computing the dynamic force threshold.

In another example, a dynamic threshold may be defined based on a sensed movement of the device 100. For example, one or more internal sensors, such as an accelerometer, a gyrometer, an inclinometer, or other position/movement sensor, may be used to determine if the device is tipping and/or sliding in response to touch input on the touch-sensitive surface 110. For example, the device 100 may be configured to detect momentary tipping or shifting of the device in response to interaction with the touch-sensitive surface 110. In some cases, in response to detecting an undesirable level of movement, the device 100 may be configured to reduce the force threshold used to initiate a force- or press-event. In some cases, the force threshold is incrementally reduced until the movement of the device reaches an acceptable level. Additionally or alternatively, an alarm or alert may be generated in response to a tipping and/or sliding in response to touch input on the touch-sensitive surface 110. In some cases, the force threshold may be reset to a default or nominal value if the device 100 does not move again for a predetermined period of time.

A dynamic force threshold or force limit calculation (e.g., $F_{t\,max}$, $F_{region\,max}$, $F_{friction\,max}$) may be used to trigger one or more countermeasures to prevent movement or potential damage to the device 100. In one example embodiment, an estimation of a force limit or threshold such as $F_{t\,max}$ may be used to generate an alarm or alert that the device is about to tip. In this case, a user press or touch that is at or near the $F_{t\,max}$ value may cause the device to produce an audible, haptic, and/or visual alarm or alert that is intended to notify the user that the device 100 is about to become unstable. In some implementations, an additional force threshold may be defined that may be used to trigger or generate an alarm or alert. The additional force threshold may be greater than the force threshold used to initiate a force-event signal, but less than or equal to the $F_{t\,max}$ value.

In another example embodiment, an estimation of a force limit or threshold, such as $F_{t\,max}$, may be used to trigger or initiate a state or mode of operation for the device 100. For example, based on a force limit or threshold, the device 100 may initiate a safe or protection mode, which may be configured to reduce or prevent damage due to a tipping or falling event. In one implementation, the device 100 may enter or initiate a safe mode in response to receiving a forceful touch that exceeds a force limit or threshold. The safe mode may momentarily suspend one or more operations to prevent the loss of data or damage due to a tipping, falling or other impact-causing event, which may be caused by the forceful touch. Additionally or alternatively, the safe mode may deploy a mechanical countermeasure, such as a bumper, bladder, mechanical lockout, or other similar mechanism, that is configured to reduce or prevent damage to the device 100 due to a tipping, falling, or other impact-causing event.

A dynamic force threshold or force limit calculation (e.g., $F_{t\,max}$, $F_{region\,max}$, $F_{friction\,max}$) may be used to raise the threshold. For example, if it is estimated that the stability condition is capable of withstanding a greater amount of force without becoming unstable or moving, the force threshold used to initiate a press-event signal may be increased. Additionally, if it determined that the device 100 is being transported or being used in a dynamic environment (e.g., in vehicle on a bumpy road), the threshold may be increased to reduce incidental or accidental touches from initiating press-event signals. In some cases, the device 100 may be configured to reject, suppress, or ignore touches and/or forceful touches in response to a determination that the device 100 is being transported or being used in a dynamic environment. The device 100 may use one or more motion sensors (e.g., accelerometers, gyrometers, global positioning signals, and the like) to determine that the device 100 is in a dynamic environment and/or is being transported.

These examples are illustrative with respect to the specific support configuration depicted in FIGS. 3 and 4 and are not intended to be limiting. The specific calculations used to determine the dynamic force threshold may vary depending on the support and/or mounting configuration used. FIGS. 5-8 depict additional example mounting configurations that may also use a dynamic thresholding in accordance with some embodiments.

Figure 5:
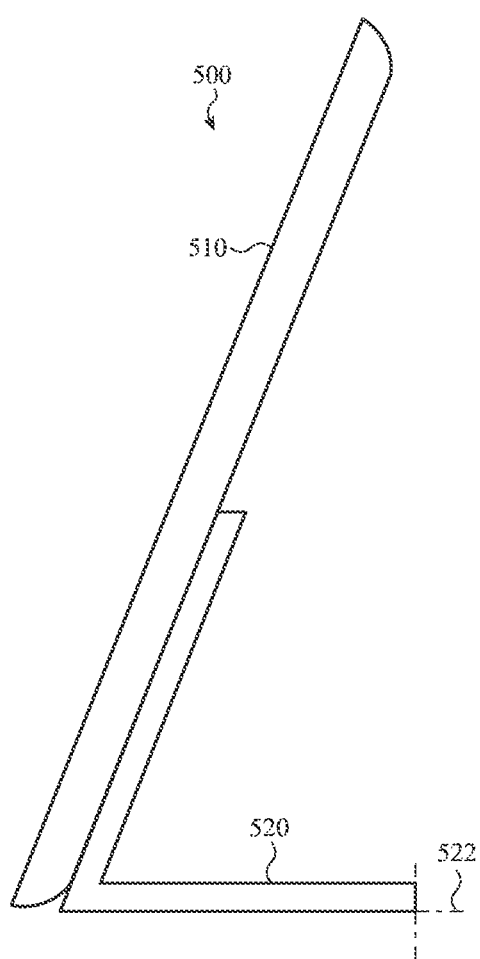
FIG. 5 depicts an example electronic device and an example support accessory.

FIG. 5 depicts an example electronic device and an example support accessory. Similar to the previous example, the device 500 may be coupled to a support structure, in this case, a stand 520. Similar to the previous example, the stand 520 is configured to support the device in an upright or inclined orientation. The device 500 may be a mobile phone, portable media player, or other portable electronic device having a touch-sensitive surface 510 that is configured to receive force input. The device 500 may include similar features and elements as described above with respect to device 100 in FIGS. 1-4, above.

As shown in FIG. 5, the stand 520 may define a pivot point or pivot axis 522 about which the device 500 will rotate if a torque exceeding a static limit is exceeded. For example, the static limit may be a static torque corresponding the weight and center of gravity of the device 500 and stand 520. Similar to the examples provided above with respect to FIG. 3, a dynamic force threshold (or thresholds) may be defined to reduce the possibility of tipping about axis 522 and/or sliding across a support surface due to the force of touch input on the touch-sensitive surface 510. Using similar techniques described above with respect to FIG. 3 and Equations 1-3, the device 500 may determine or define a dynamic threshold that is determined based on a support condition associated with the mounting configuration depicted in FIG. 5.

While the stand 520 of FIG. 5 is depicted as a rigid structure, in some embodiments, the stand 520 may include one or more hinge joints that allow the stand 520 to be folded or flattened. The hinge joints may be locked or otherwise secured when the device 500 is in use to provide a substantially rigid support structure for the device 500. In some implementations, the stand 520 is a dual purpose accessory and, in one mode, may be used to support the device 500 and, in another mode, be used to protect or cover the device 500.

The stand 520 may be removably attached to the device 500 or, alternatively, the stand 520 may be integrally formed with the enclosure or another component of the device 500. In some implementations, the stand 520 may be integrally formed within the device housing or enclosure. For example, the stand 520 may be formed from a portion of the housing or enclosure of the device that includes a feature or element that protrudes or extends outward to support the device 500 in an inclined position, as shown in FIG. 5. In some implementations, the stand 520 is integrally formed with a protective case that is attached to the enclosure of the device 500. For example, such a protective case may be configured to provide physical protection for the device 500 and also include one or more features for supporting the device 500 in an inclined position, as shown in FIG. 5.

Figure 6:
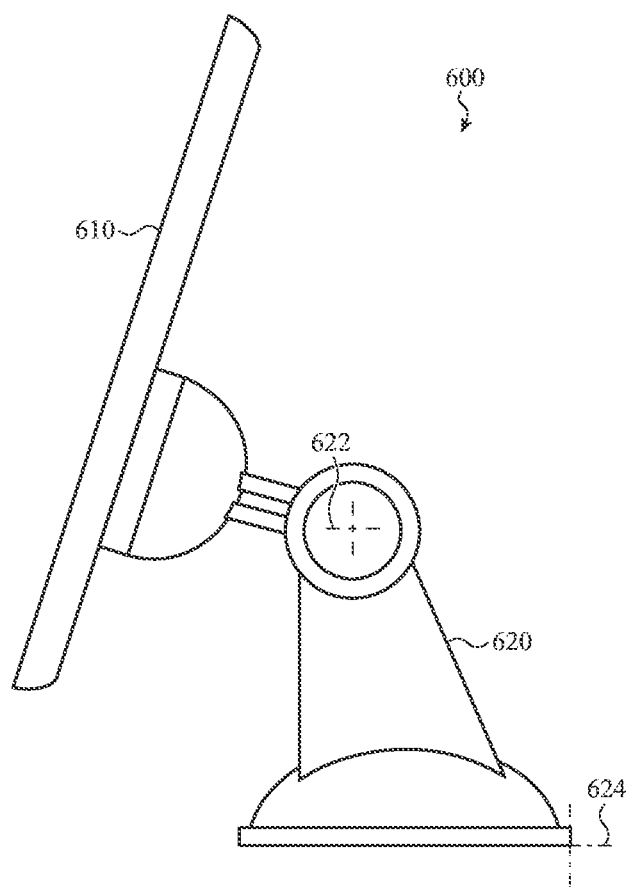
FIG. 6 depicts an example display device having a support structure.

FIG. 6 depicts an example display device having a support structure. In this example, a display device 600 includes a touch-sensitive surface 610 that is configured to detect both a location and a magnitude of force on the front of the display device 600. The display device 600 may be operatively coupled to a stand-alone computer system such as a desktop or terminal computer system. As shown in FIG. 6, the display device 600 may include a support stand 620 that is configured to rest or be supported by a surface of an external object, such as a desk or table. The support stand 620 may define one or more pivots 622, 624 about which the display device 600 may rotate if a torque is applied that exceeds the static limits.

In particular, as shown in FIG. 6, the support stand 620 defines a hinged pivot 622 that allows for the adjustment or movement of the display 600. The hinged pivot 622 may be configured to be locked or fixed when not being adjusted. The hinged pivot 622 may, for example, be configured to hold or maintain the display 600 at a fixed orientation during normal or predicted operating conditions. In some cases, the hinged pivot 622 may include a mechanical clutch or engagement that prevents movement if a static breaking torque is not exceeded. In accordance with some embodiments, the force threshold of the display 600 may be dynamically adjusted to reduce the chance that the static breaking torque of the hinged pivot 622 will be exceeded. A sample estimation of the maximum touch force $F_{t\ max}$ may be based on the following relationship:

$$F_{tmax} = \frac{T_{static}}{D_t},\qquad \text{Equation 4}$$

where $F_{t\ max}$ is the maximum force that can be applied without causing the display to move, $D_t$ is the distance from the top of the touch-sensitive surface 610 to the hinged pivot 622, and $T_{static}$ is the static breaking torque that hinged pivot 622 can resist. Accordingly, the dynamic threshold may be set to a value that is less than or equal to $F_{t\ max}$ based on the relationship of Equation 4. Similarly, multiple thresholds may be defined for multiple respective sub-regions using Equation 4 and using the distance between the sub-region and the hinged pivot 622 for the value $D_t$.

In some embodiments, the hinged pivot 622 may have a variable or adjustable static breaking torque. For example, the hinged pivot may include a tensioning or tightening electromechanical or mechanical system that increases or decreases the static breaking torque, such as an adjustable clutch or variable friction coupling. In some implementations, the static breaking torque may be adjusted or varied in response to a touch in a particular location or region. For example, the static breaking torque $T_{static}$ may be increased in response to a touch near the edge of the display 600 in order to prevent or reduce the chance of rotation of the display 600 due to the force of a touch. The static breaking torque $T_{static}$ may also be adjusted (e.g., increased) in response or in accordance with an adjusted force threshold. For example, an adjusted force threshold may be computed using a nominal or baseline breaking torque value. The actual static breaking torque of the hinged pivot 622 may then be increased to provide a more rigid support to further reduce the probability that the display 600 will move in response to touch interaction with the touch-sensitive surface 610.

Additionally, similar to the previous examples, the support stand 620 defines an inherent tipping axis or pivot 624 defined along an edge of an interface between the support stand 620 and the supporting surface. The tipping axis or pivot 624 is the point or axis about which the display 600 will rotate or tip if a torque that exceeds the static weight of the display device 600 is exceeded. Similar to the previous examples described above with respect to FIG. 3 and Equations 1 and 2, one or more dynamic force thresholds may be defined based on the location of the tipping axis or pivot 624. Also, similar to the previous example provided above with respect to FIG. 3 and Equation 3, a dynamic force threshold may be determined based on an estimated friction between an interface between the support stand 620 and the supporting surface of an external object such as a table or desk.

Figure 7:
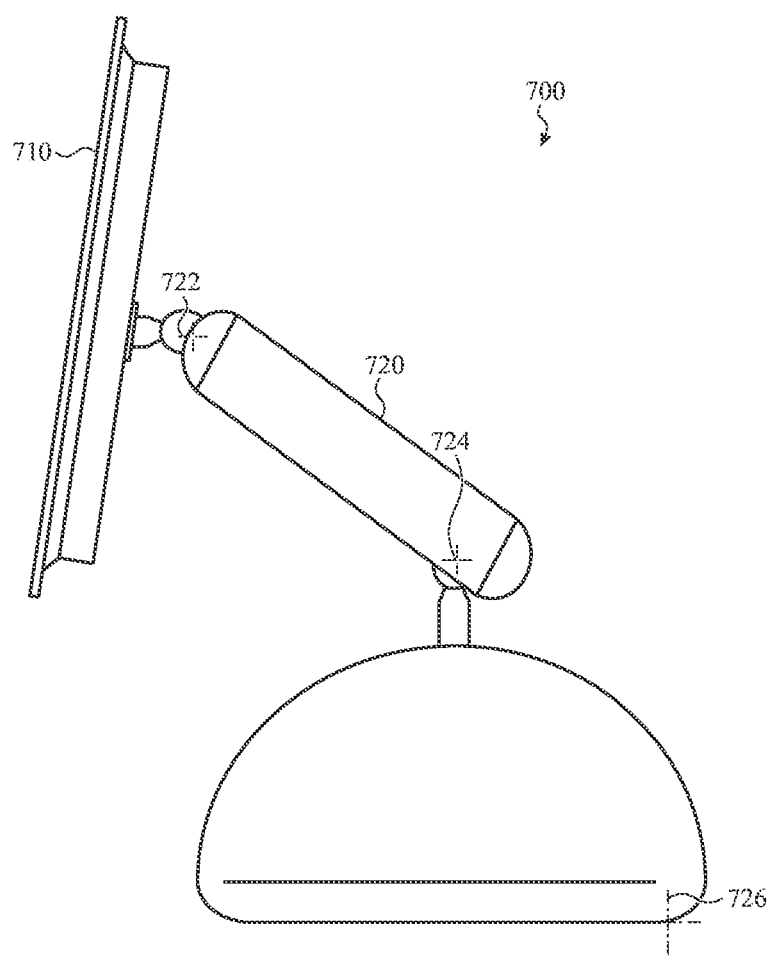
FIG. 7 depicts an example computing system having a support structure.

FIG. 7 depicts an example computing system having a support structure. In this example, a computing system 700 includes a touch-sensitive surface 710 that is configured to detect both a location and a magnitude of force on a display portion of the computing system 700. As shown in FIG. 7, the computing system 700 may include a support stand 720 that defines one or more pivot points or pivot axes about which the display portion may rotate if a torque is applied that exceeds the static limits.

In particular, as shown in FIG. 7, the support stand 720 defines two hinged pivots 722 and 724 that allows for the adjustment or movement of the display portion of the computing system 700. Similar to the previous examples, the hinged pivots 722 and 724 may be configured to be locked or fixed when not being adjusted. In some cases, the hinged pivots 722 and 724 may include a mechanical clutch or engagement that prevents movement or is otherwise immobile if a static breaking torque is not exceeded. In particular, the hinged pivots 722 and 724 may remain immobile of the force of a touch results in a torque that is less than or equal to the static breaking torque of the respective hinged pivots 722 and 724. In accordance with some embodiments, the force threshold of the computing system 700 may be dynamically adjusted to reduce the chance that the static breaking torque of the hinged pivots 722 and 724 will be exceeded. The dynamic threshold may be computed using a relationship similar to the one described in Equation 4 with respect to FIG. 6, above. Accordingly, the hinged pivots 722 and 724 may be configured to remain immobile in response to a touch that is less than or equal to the dynamic threshold.

In this example, the upper hinged pivot 722 is a ball joint that is configured to rotate about multiple axes. Specifically, the upper hinged pivot 722 allows the display portion to tilt up and down as well as side-to-side. The ball joint may also allow the display portion to rotate in-plane about the center of the display. The ball joint may have a static torque that resists unintentional rotation of the display portion. To help reduce unintentional movement due to normal touch interaction with the touch-sensitive surface 710, multiple region-specific thresholds may be defined over the touch-sensitive surface 710.

In some embodiments, the force threshold may vary along the two-dimensional touch-sensitive surface 710. In particular, the force threshold may vary along a horizontal direction (e.g., x-direction) such that the force threshold decreases with distance from the center of the upper hinged pivot 722. Similarly, the force threshold may vary along a vertical direction (e.g., y-direction) such that the force threshold decreases with distance from the center of the upper hinged pivot 722. Example region-specific threshold configurations in accordance with this embodiment are described in more detail below with respect to FIGS. 10 and 11.

Similar to the example provided above with respect to FIG. 6, the static breaking torque of the hinged pivots 722 and 724 of FIG. 7 may be dynamically adjusted or varied in response to force threshold calculation and/or to a touch on the touch-sensitive surface. For example, the static breaking torque may be increased in response to a touch near the edge of the touch-sensitive surface 710 in order to prevent or reduce the chance of rotation of the display due to the force of a touch. Similarly, the static breaking torque may be increased based on an adjusted force threshold calculated using, for example, a relationship described above with respect to Equation 4. The static breaking torque may be adjusted using a mechanical or electromechanical joint that includes an adjustable clutch or variable friction coupling. The adjustment of the static breaking torque may occur in addition to an adjustment of the force threshold in accordance with embodiments described herein.

Similar to the previous examples, the support stand 720 defines an inherent pivot point 726 along an edge of the interface between the support stand 720 and the support surface. Similar to the examples provided above, a dynamic force threshold may be defined based on an estimated maximum force that will result in tipping and/or sliding of the computing system 700.

While the examples of FIG. 7 depicts one example linkage having multiple pivots, other embodiments may include alternative arrangements of the pivot points and/or the connecting links. In one example, a support stand may include a mechanical linkage having multiple pivot points and connecting links that are configured to produce a linear motion in response to a force that exceeds a static breaking threshold. Using the techniques and principles described herein, a dynamic threshold may be computed or adjusted based on the estimated static breaking torque of the corresponding pivots that would result in a linear translation of the touch-sensitive surface and associated components of the device.

Figure 8:
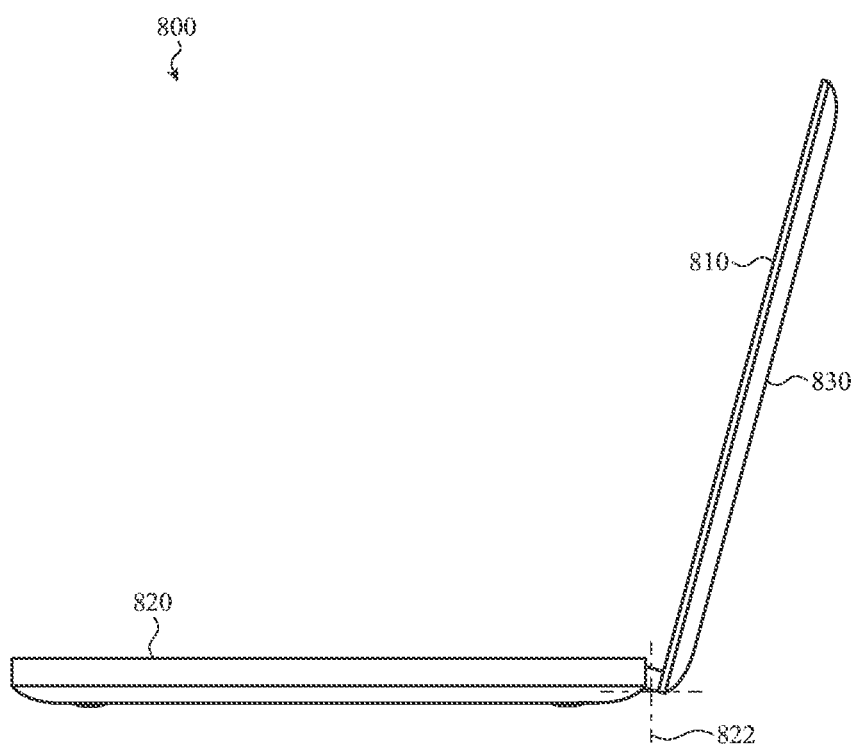
FIG. 8 depicts an example notebook computing system having a hinged display.

FIG. 8 depicts an example notebook computing system having a hinged display. In this example, the notebook computing system 800 includes a touch-sensitive surface 810 that is configured to detect both a location and a magnitude of force on a display portion of the notebook computing system 800. As shown in FIG. 8, the notebook computing system 800 may include a hinged coupling 822 that is configured to provide a rotational coupling between the upper portion 830 and the lower portion 820 of the notebook computing system 800. The hinged coupling 822 defines a pivot axis about which the upper portion 830 may rotate if a torque is applied that exceeds the static limits.

Similar to the previous examples, the hinged coupling 822 may be configured to be locked or fixed when not being adjusted. In some cases, the hinged coupling 822 may include a mechanical clutch or engagement that prevents movement if a static torque is not exceeded. In accordance with some embodiments, the force threshold of the notebook computing system 800 may be dynamically adjusted to reduce the chance that the static torque of the hinged coupling 822 will be exceeded. The dynamic threshold may be computed using a relationship similar to the one described in Equation 4 with respect to FIG. 6, above. Also similar to the previous examples, the force threshold of the notebook computing system 800 may be adjusted based on an estimated friction between the lower portion 820 and the supporting surface.

Similar to the example provided above with respect to FIGS. 6 and 7, the static breaking torque of the hinged coupling 822 of FIG. 8 may be dynamically adjusted or varied in response to a touch on the touch-sensitive surface. For example, the static breaking torque may be increased in response to a touch near the edge of the touch-sensitive surface 810 in order to prevent or reduce the chance of rotation of the display due to the force of a touch. The static breaking torque may be adjusted using a mechanical or electromechanical joint that includes an adjustable clutch or variable friction coupling.

The adjustment of the static breaking torque may occur in addition to and/or in response to an adjustment of the force threshold in accordance with embodiments described herein. For example, the static breaking torque may be adjusted (e.g., increased) in response or in accordance with an adjusted force threshold. Using a relationship similar to the one described above with respect to Equation 4, an adjusted force threshold may be computed using a nominal or baseline breaking torque value. The actual static breaking torque of the hinged coupling 822 may then be increased to provide a more rigid support to further reduce the probability that the upper portion 830 will move in response to touch interaction with the touch-sensitive surface 810.

Figure 9:
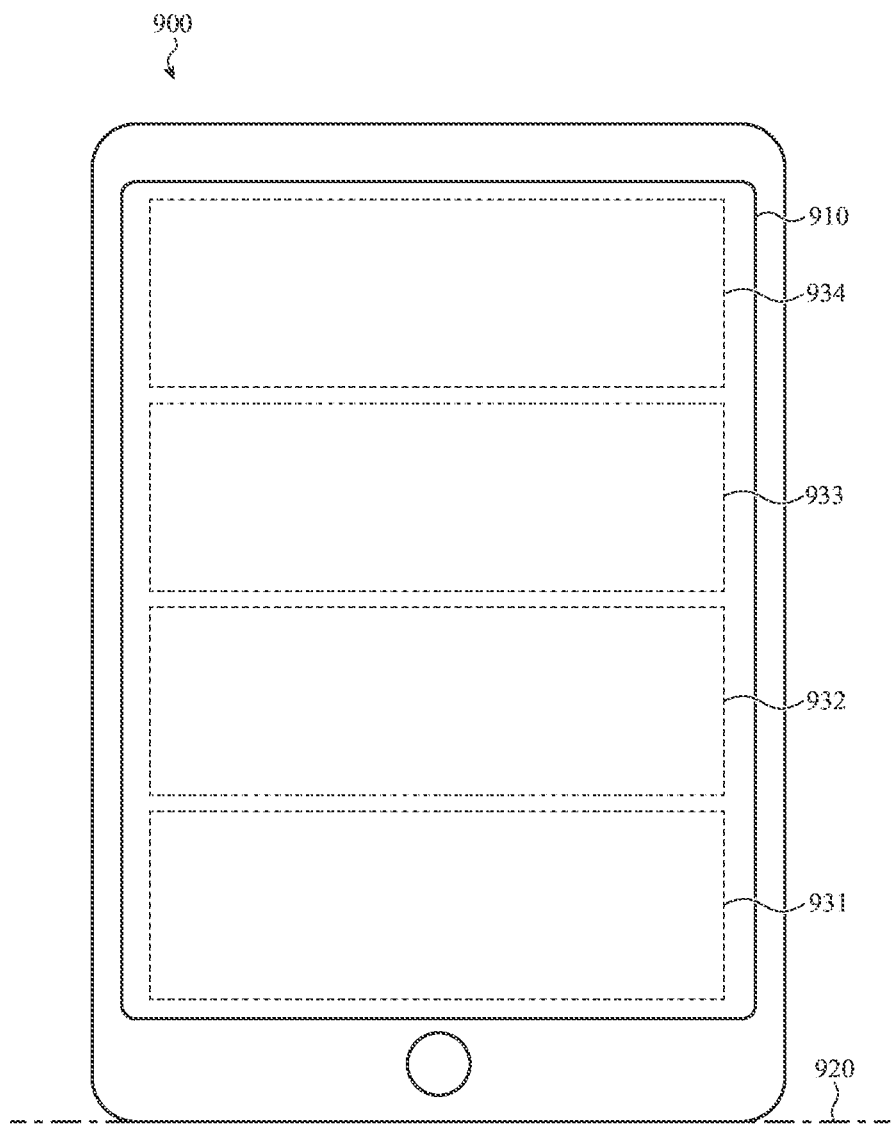
FIGS. 9-11 depict an example tablet computing system having multiple sub-regions defined over a touch-sensitive surface.
Figure 10:
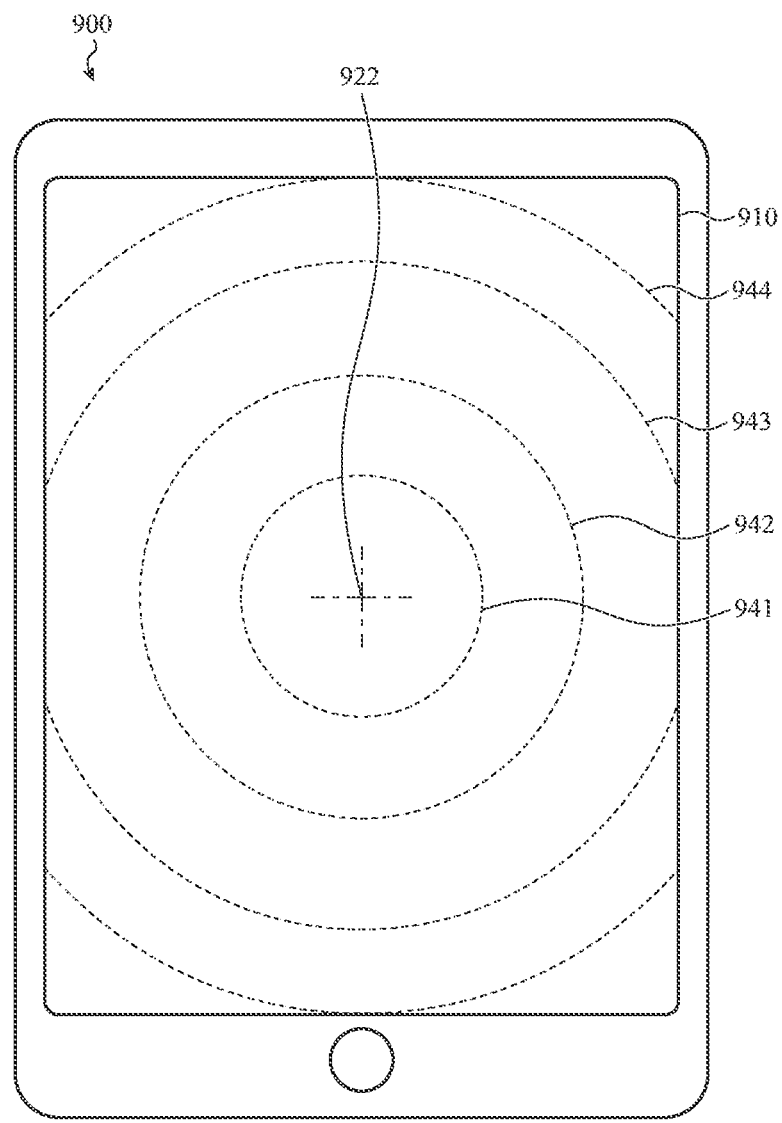
Figure 11:
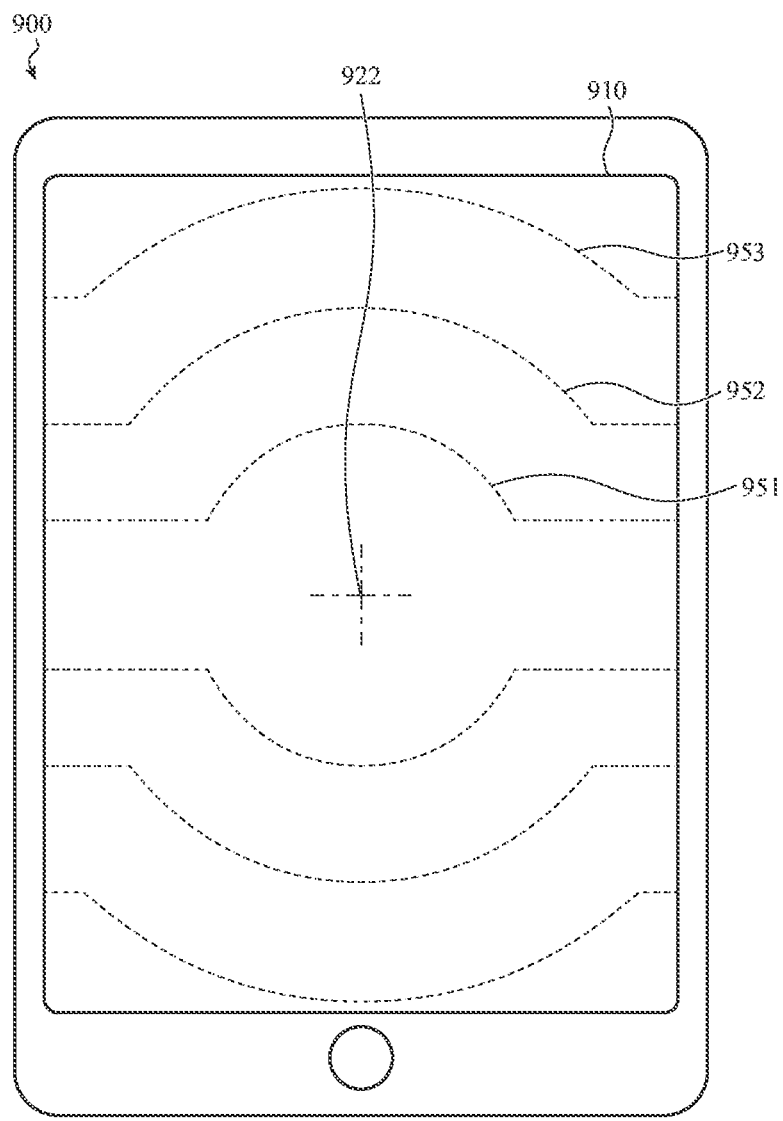

FIGS. 9-11 depict an example tablet computing system having multiple sub-regions defined over a touch-sensitive surface. In accordance with some embodiments, multiple sub-regions may be defined over a touch-sensitive surface, and a respective region-specific threshold may be assigned to or defined for each sub-region.

FIG. 9 depicts an example device 900 having multiple sub-regions defined with respect to pivot 920. The example depicted in FIG. 9 may represent a mounting configuration similar to the support stand configurations of FIGS. 3, 4, and 5. That is, the device 900 may be supported in an upright or inclined position using a stand that may define a pivot 920 about which the device 900 will rotate if the static torque is exceeded. To reduce the chance that touch interactions with the touch-sensitive surface 910 will result in tipping or undesirable movement of the device 900, multiple region specific regions, each having a region-specific threshold, may be defined over the touch-sensitive surface 910.

As shown in FIG. 9, four sub-regions 931, 932, 933, and 934 are defined along the length of the touch-sensitive surface 910. To reduce the chance of undesirable movement while also providing an optimized or maximized force response, a dynamic region-specific force threshold may be defined or assigned to each respective sub-region. In general, the region-specific force thresholds may decrease as the distance from the pivot axis 920 is increased. For example, the force threshold of sub-region 934 may be less than the force threshold of sub-region 933, which in turn has a force threshold that is less than the force threshold of sub-region 932. Sub-region 931 may have the largest or greatest force threshold as compared to the set of sub-regions 932, 933, and 934. The region-specific force thresholds may be computed or determined in accordance with the relationship described above with respect to Equation 2. FIG. 9 depicts one example implementation having an arbitrary size, shape, and number. These and other aspects of the sub-regions may vary in different embodiments.

In some embodiments, the device 900 is configured to redefine the sub-regions 931-934 in response to a change in orientation. For example, if the device 900 is rotated 90 degrees into a support configuration such that the pivot axis 920 is parallel to the long sides or length of the device 900, the sub-regions and the corresponding dynamic thresholds may be redefined accordingly. In particular, each of the sub-regions may be defined along the length of the device 900 (as opposed to along the width as shown in FIG. 9). Similar to as described above, those sub-regions that are further from the pivot axis 920 may have a reduced dynamic threshold as compared to those sub-regions that are closer to the pivot axis 920. The number of sub-regions may be reduced or changed to accommodate the aspect ratio of the touch-sensitive surface 910 or accommodate other geometric constraints.

FIGS. 10 and 11 depict alternative configurations having multiple sub-regions defined over the touch-sensitive surface 910. The configurations of FIGS. 10 and 11 may be consistent with a support configuration that defines a two-dimensional pivot 922 at or near the center of the touch-sensitive surface 910. Such a support configuration may be consistent with the ball-joint pivot configuration described above with respect to FIG. 7. In this configuration, the device 900 may rotate side-to-side as well as up and down to accommodate a viewing angle or otherwise present the touch-sensitive surface in a preferred orientation with respect to the user.

As shown in FIG. 10, multiple ring-shaped sub-regions 941, 942, 943, and 944 may be defined and a region-specific threshold may be assigned to or defined for each respective sub-region. In general, the region-specific thresholds may be reduced as the distance from the pivot 922 is increased. In particular, the sub-region 941 may have the greatest force threshold because it is located at or near the pivot 922. Each surrounding sub-region 942, 943, and 944 may have a progressively decreasing dynamic threshold as each region is further from the pivot 922.

FIG. 11 depicts an alternative sub-region definition. Instead of concentric or expanded sets of ring-shaped sub-regions, multiple nested sub-regions 951, 952, and 953 may be defined over the touch-sensitive surface 910. Similar to the previous examples, the sub-regions that are located closer to the pivot 922 may have a dynamic force threshold that is greater than those sub-regions that are further from the pivot 922. Accordingly, sub-region 951, which includes the pivot 922 may have the largest dynamic threshold, while the dynamic region-specific thresholds associated with surrounding regions 952 and 953 may be progressively reduced.

The dynamic region-specific thresholds may be computed or estimated based on an estimated static condition. In particular, if the pivot 922 has a static torque, the dynamic region-specific thresholds may be computed in accordance with the relationship described above with respect to Equation 4.

Figure 12:
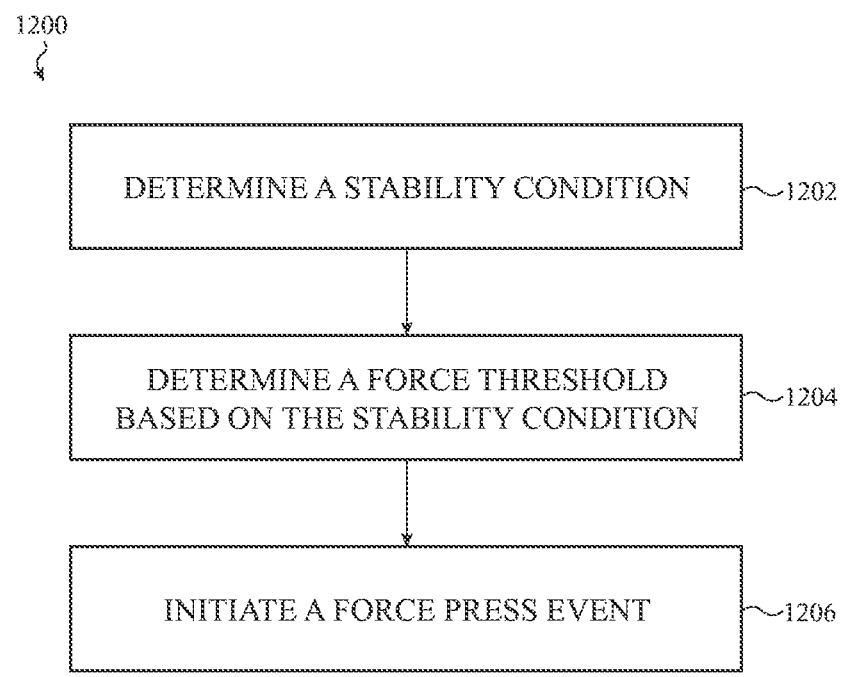
FIG. 12 depicts an example process for dynamically adjusting a force threshold of an electronic device.

FIG. 12 depicts an example process 1200 for dynamically adjusting a force threshold of an electronic device. The process 1200 may be implemented on any of the example devices discussed above with respect to FIGS. 1-11 or below with respect to FIG. 13. The following process 1200 may be used to dynamically adjust a force threshold for a touch-sensitive surface or touch-sensitive button and implemented using, for example, the processing unit and other hardware elements described with respect to FIG. 13 or other embodiments described herein. The process 1200 may be implemented as processor-executable instructions that are stored within the memory of the electronic device.

In operation 1202, a stability condition is estimated or determined. The stability condition may correspond to a particular support or mounting configuration of the device. In some examples, the device is configured to use one or more internal sensors, user inputs, or electrical signals from an external device to determine or estimate how the device is currently being supported or mounted. In one example, operation 1202 may determine that the device is either hand-held or being supported by a stationary object. Operation 1202 may further determine the orientation of the device and/or position of the device. In general, operation 1202 may be used to estimate the susceptibility of the device to slipping, tipping, or otherwise being adversely affected by a forceful touch on a touch-sensitive surface, such as a touch screen or touch sensor.

In one example embodiment of operation 1202, the device may be configured to determine that the device is being supported by a support accessory, such as a stand or mount. The determination may be made based on a sensed position of the device and/or a sustained period of non-movement that is consistent with the device being supported by a particular support accessory. In particular, the orientation of the device may be determined using one or more sensors including, without limitation, an accelerometer, an inclinometer, a gyrometer, a magnetometer, and so on. The determination may also be made based on a sustained or measured period of non-movement in which the orientation of the device does not significantly change.

In another example embodiment of operation 1202, the device may be configured to determine that the device is being supported by a particular component based on an electrical or coupling or sensed proximity of the component to the device. In some embodiments, the device includes a proximity sensor that is configured to detect the presence of a support accessory, such as a stand or mount. The proximity sensor may also be configured to identify the type of support accessory that is attached using, for example, magnetic coding or other electromagnetic sensing technique. Additionally or alternatively, the device may be configured to electrically couple to a support accessory having a processing unit or other electronic components. In some embodiments, the support accessory may be characterized as an electronic device and may include one or more components of an electronic device, as described below with respect to FIG. 13. A support accessory that includes one or more electronic components, particularly some form of processing unit, may be referred to as an electronic stand. An electrical signal received from the support accessory (e.g., an electronic stand) may be used to make the determination of operation 1202.

In another example embodiment of operation 1202, the device may be configured to determine that the device is being held or supported by the user. If the device is a tablet device, mobile telephone, portable media player or other hand-held device, the determination may be made based on an orientation and/or a sensed movement of the device that is consistent with a hand-held scenario. If the device is a wearable electronic device, such as a smart watch, health monitoring device, or other similar device, the determination may be made based on a detected coupling to or with a body part of the user. In some cases, the device may be configured to detect the proximity or presence of the user using a capacitive, inductive, optical, or other similar measurement. In some cases, the device may be configured to detect moisture, such as perspiration, which may indicate that the hand-held support is slippery or less stable than normal.

In another example embodiment of operation 1202, the device may be configured to detect an unstable mounting or support configuration. Using one or more internal sensors, the device may be configured to detect movement of the device that is consistent with the device tipping, sliding, or slipping in response to interaction with the touch-sensitive surface. For example, the device may use an accelerometer, an inclinometer, a gyrometer, or other similar sensor to detect momentary rotation that is consistent with a tipping or rocking motion of the device due to a user pressing on the touch-sensitive surface. In another example, the device may use a position sensor to determine that the device is sliding or slipping across a support surface. The device may also be configured to use a microphone, camera or other sensor to detect changes in the environmental conditions that are consistent with a sliding or slipping scenario.

In operation 1204, a force threshold is determined based on the estimated stability condition. In particular, the device may be configured to determine a force threshold that is less likely to cause undesirable movement of the device due to normal or predicable interaction with a touch-sensitive surface. Normal or predictable interaction may correspond to, for example, touch- and force-based input that can be sensed by the touch-sensitive surface within the operational parameters of the device. With respect to the embodiments described above, the device may determine a dynamic threshold based on the relationships illustrated above with respect Equations 1-4 discussed above. In particular, the dynamic threshold may be determined based on a likelihood that the device will tip in response to a forceful touch on the touch-sensitive surface using the determination of operation 1202, above. The dynamic threshold may also be determined based on a likelihood that the device will slip or slide across a supporting surface, within the user's hands, or slide about the user's body, depending on the estimated stability condition.

In some embodiments, two or more types of thresholds are determined and used to define the dynamic threshold. For example, both a tipping threshold and a sliding or slipping threshold may be determined based on the support configuration. The tipping threshold may be determined in accordance with, for example, the relationships illustrated in Equations 1 and 2 described above. A sliding threshold may be determined in accordance with, for example, the relationship illustrated in Equation 3 described above. Additionally or alternatively, a pivot-slipping threshold that estimates the movement of a mechanical joint or connection may be determined in accordance with, for example, the relationship illustrated in Equation 4, described above. The device may be configured to select the lowest threshold of two or more threshold types when determining the dynamic threshold of the device. Alternatively, the device may be configured to compute a composite dynamic threshold that accounts for a dominating effect due to a touch. For example, if a device is mounted on a stand as depicted in FIG. 3, a touch lower on the touch-sensitive surface 110 may be more likely to result in a slide and, thus, the sliding threshold may dominate. A touch higher on the touch-sensitive surface 110 may be more likely to result in a tipping of the device 100 and, thus, the tipping threshold may dominate. In some cases, the device is configured to compute a transition between, a tipping threshold, a slipping threshold, a pivot-slipping threshold, or other type of threshold in order to determine which threshold to apply to the dynamic threshold.

With respect to operation 1204, the force threshold of the device and/or an associated accessory may be determined or defined. In particular, the dynamic force threshold may be applied to a force sensor that is operatively coupled or integrated with the touch-sensitive surface of the device. Additionally or alternatively, the dynamic force threshold may be applied to an accessory, such as a stylus or pen, having a force sensor that is configured to measure a force applied to the device.

The force threshold may vary across the surface of the device. As described with respect to FIGS. 9-11, multiple sub-regions may be defined over the surface of the device. Accordingly, the force threshold may vary along one direction or two directions, depending on the support configuration. A one-dimensional variation in the force threshold may be appropriate for support configurations that define a single pivot axis while a two-dimensional variation may be appropriate for support configurations that define a multi-axis or ball-joint pivot. While the examples of FIGS. 9-11 depict a region-specific threshold that varies by an area or sub-region, the threshold may vary continuously along the touch-sensitive surface. Hence, the resolution at which the threshold may be varied may correspond to the resolution of the location that can be determined using the touch sensor of the device. The threshold may vary in a linear or a non-linear fashion across the touch-sensitive surface depending on the embodiment.

With respect to operation 1204, the dynamic threshold may be configured to vary over time or may be subject to periodic calibration. For example, the dynamic threshold may be adjusted over time over the life of the device to account for changes in a structural joint or pivot, which may become more loose or easier to move with repeated use. The dynamic threshold may also be adjusted to account for changes in temperature or other environmental conditions that may also affect the likelihood that the device will tip or slide in response to user input. A periodic calibration may be used to test the stability of the device, and the dynamic threshold may be adjusted accordingly. For example, the threshold may be increased until an unstable condition is detected, and then the dynamic threshold may be set to a new calibrated value based on the measured stability or rigidity of the support.

In some embodiments, the dynamic threshold may be user specific. For example, the device may be configured to identify the user using sensors and/or manual user input. The device may then adjust the dynamic threshold based on the preferences or settings associated with that particular user. The settings may allow for further adjustment of the dynamic threshold within a range or in accordance with the preferences set for the specific user.

In general, operations 1202 and 1204 may be performed on regular intervals to adjust the dynamic force threshold to match changing support configurations. For example, the device may be configured to detect a change in the support configuration determined in operation 1202. In response to a change in the support configuration, the device may be configured to determine one or more new dynamic thresholds. In some cases, the sub-regions or other scheme for varying the threshold over the touch-sensitive surface of the device is updated in response to a change in the support configuration. By way of specific example, a set of region-specific thresholds and a sub-region definition may be updated when a device is rotated from use in a portrait to a landscape orientation.

In operation 1206, a force-event or press-event signal is initiated or triggered based on a touch that exceeds the threshold defined in operation 1204. As previously described, a press-event signal may be used as a user input to control an aspect of the device. For example, the dynamic threshold may define which user touch interactions are recognized as a force touch and which interactions are simply a touch. The distinction may allow the device to recognize a user selection of a displayed object or invoke some other action due to a forceful touch. In some cases, the dynamic threshold is used to distinguish a gesture user input from an accidental or incidental touch on the surface of the device. In some embodiments, multiple dynamic thresholds may be defined, each threshold associated with a different level of functionality.

In some embodiments, the dynamic threshold is used to adjust a scale or range of continuous force input that is recognized by the device. For example, the force sensor may be used to produce an analog or substantially continuous output that corresponds to a variable force exerted on the device. The analog or substantially continuous output may be used to adjust the volume of the device, brightness of the screen, or control some other continuously variable aspect of the device or a software application. The dynamic threshold may be used to scale the output that is recognized by the device to reduce the risk that the touch interaction will result in undesirable movement of the device.

In some embodiments, the dynamic threshold is used to adjust a trigger or actuation point for a virtual or software-driven button defined over the touch-sensitive surface. In some cases, the touch-sensitive surface is defined over a display that is configured to display user-selectable objects, such as buttons or other controls. In other cases, the touch-sensitive surface is defined over a region of the device associated with a dedicated button or user input. For example, the dynamic threshold defined in operation 1204 may be used to determine the actuation sensitivity of a home button or other dedicated user-control surface on the device.

The operations of process 1200 may be performed in a continuous fashion during the operation and use of a touch-sensitive surface. In some embodiments, process 1200 is performed automatically when the touch-sensitive surface of the device is in use. Alternatively, the process 1200 may be triggered by a user-input or some other initiating event. The operations of process 1200 are merely illustrative in nature and are not intended to be limiting.

FIG. 13 depicts example components of an electronic device in accordance with the embodiments described herein. The schematic representation depicted in FIG. 13 may correspond to components of the devices depicted in FIGS. 1-11, described above However, FIG. 13 may also more generally represent other types of devices that include any device configured to receive force-input in accordance with the embodiments described herein.

As shown in FIG. 13, a device 1300 includes a processing unit 1302 operatively connected to computer memory 1304 and computer-readable media 1306. The processing unit 1302 may be operatively connected to the memory 1304 and computer-readable media 1306 components via an electronic bus or bridge. The processing unit 1302 may include one or more computer processors or microcontrollers that are configured to perform operations in response to computer-readable instructions. The processing unit 1302 may include the central processing unit (CPU) of the device. Additionally or alternatively, the processing unit 1302 may include other processors within the device including application specific integrated chips (ASIC) and other microcontroller devices. The processing unit 1302 may be configured to perform functionality described in the examples above, including, without limitation, the operations of process 1200 described above with respect to FIG. 12.

The memory 1304 may include a variety of types of non-transitory computer-readable storage media, including, for example, read access memory (RAM), read-only memory (ROM), erasable programmable memory (e.g., EPROM and EEPROM), or flash memory. The memory 1304 is configured to store computer-readable instructions, sensor values, and other persistent software elements. Computer-readable media 1306 also includes a variety of types of non-transitory computer-readable storage media including, for example, a hard-drive storage device, a solid state storage device, a portable magnetic storage device, or other similar device. The computer-readable media 1306 may also be configured to store computer-readable instructions, sensor values, and other persistent software elements.

In this example, the processing unit 1302 is operable to read computer-readable instructions stored on the memory 1304 and/or computer-readable media 1306. The computer-readable instructions may adapt the processing unit 1302 to perform the operations or functions described above with respect to FIGS. 1-11 or below with respect to the example process FIG. 13. In particular, the processing unit 1302, the memory 1304, and/or the computer-readable media 1306 may be configured to implement a dynamic force threshold for one or more touch-sensitive surfaces of the device 1300. The computer-readable instructions may be provided as a computer-program product, software application, or the like.

As shown in FIG. 13, the device 1300 also includes a display 1308. The display 1308 may include a liquid-crystal display (LCD), organic light emitting diode (OLED) display, light emitting diode (LED) display, or the like. If the display 1308 is an LCD, the display may also include a backlight component that can be controlled to provide variable levels of display brightness. If the display 1308 is an OLED or LED type display, the brightness of the display 1308 may be controlled by modifying the electrical signals that are provided to display elements.

The device 1300 may also include a battery 1309 that is configured to provide electrical power to the components of the device 1300. The battery may include one or more power storage cells that are linked together to provide an internal supply of electrical power. The battery 1309 may be operatively coupled to power management circuitry that is configured to provide appropriate voltage and power levels for individual components or groups of components within the device 1300. The battery 1309, via power management circuitry, may be configured to receive power from an external source, such as an AC power outlet. The battery 1309 may store received power so that the device 1300 may operate without connection to an external power source for an extended period of time, which may range from several hours to several days.

In some embodiments, the device 1300 includes one or more input devices 1310. The input device 1310 is a device that is configured to receive user input. The input device 1310 may include, for example, a push button, a touch-activated button, a keyboard, a key pad, or the like. In some embodiments, the input device 1310 may provide a dedicated or primary function, including, for example, a power button, volume buttons, home buttons, scroll wheels, and camera buttons. Generally, a touch screen or touch-sensor may also be classified as an input device. However, for purposes of this illustrative example, the touch sensor 1320 and force sensor 1322 are depicted as distinct components within the device 1300.

The device 1300 may also include a touch sensor 1320 that is configured to determine a location of a touch over a touch-sensitive surface of the device 1300. The touch sensor 1320 may include a capacitive array of electrodes or nodes that operate in accordance with a mutual-capacitance or self-capacitance scheme. The touch sensor 1320 may be integrated with one or more layers of a display stack (e.g., one or more cover sheets) to form a touch screen similar to the example described above with respect to FIG. 2. The touch sensor 1320 may also be integrated with another component that forms an external surface of the device 1300 to define a touch-sensitive surface.

The device 1300 may also include a force sensor 1322 that is configured to receive force touch input over a touch-sensitive surface of the device 1300. The force sensor 1322 may include one or more layers that are sensitive to strain or pressure applied to an external surface of the device. In particular, the force sensor 1322 may be integrated with one or more layers of a display stack similar to the example described above with respect to FIG. 2. In accordance with the embodiments described herein, the force sensor 1322 may be configured to operate using a dynamic or adjustable force threshold. The dynamic or adjustable force threshold may be implemented using the processing unit 1302 and/or circuitry associated with or dedicated to the operation of the force sensor 1322.

The device 1300 may also include one or more sensors 1324 that may be used to detect an environmental condition, orientation, position, or some other aspect of the device 1300. Example sensors 1324 that may be included in the device 1300 include, without limitation, one or more accelerometers, gyrometers, inclinometers, goniometers, or magnetometers. The sensors 1324 may also include one or more proximity sensors, such as a magnetic hall-effect sensor, inductive sensor, capacitive sensor, continuity sensor, and the like. The proximity sensor(s) may be configured to detect the presence of a support structure or support surface and used to determine a support configuration in accordance with some embodiments.

The sensors 1324 may also be broadly defined to include wireless positioning devices including, without limitation, global positioning system (GPS) circuitry, Wi-Fi circuitry, cellular communication circuitry, and the like. The device 1300 may also include one or more optical sensors including, without limitation, photodetectors, photosensors, image sensors, infrared sensors, and the like. While the camera 1326 is depicted as a separate element in FIG. 13, a broad definition of sensors 1324 may also include the camera 1326 with or without an accompanying light source or flash. The sensors 1324 may also include one or more acoustic elements, such as a microphone used alone or in combination with a speaker element. The sensors may also include a temperature sensor, barometer, pressure sensor, altimeter, moisture sensor or other similar environmental sensor.

The sensors 1324, either alone or in combination, may generally be configured to determine an orientation, position, and/or movement of the device 1300. The sensors 1324 may also be configured to determine one or more environmental conditions, such as a temperature, air pressure, humidity, and so on. The sensors 1324, either alone or in combination with other input, may be configured to estimate a property of a supporting surface including, without limitation, a material property, surface property, friction property, or the like. Output from one or more of the sensors 1324 may be used to determine a support or mounting configuration and/or used to determine a dynamic force threshold for the device 1300.

The device 1300 may also include a camera 1326 that is configured to capture a digital image or other optical data. The camera 1326 may include a charge-coupled device, complementary metal oxide (CMOS) device, or other device configured to convert light into electrical signals. The camera 1326 may also include one or more light sources, such as a strobe, flash, or other light-emitting device. As discussed above, the camera 1326 may be generally categorized as a sensor for detecting optical conditions and/or objects in the proximity of the device 1300. However, the camera 1326 may also be used to create photorealistic images that may be stored in an electronic format, such as JPG, GIF, TIFF, PNG, raw image file, or other similar file types.

The device 1300 may also include a communication port 1328 that is configured to transmit and/or receive signals or electrical communication from an external or separate device. The communication port 1328 may be configured to couple to an external device via a cable, adaptor, or other type of electrical connector. In some embodiments, the communication port 1328 may be used to couple the device 1300 to an accessory, such as a smart case, smart cover, smart stand, keyboard, or other device configured to send and/or receive electrical signals. The communication port 1328 may be configured to receive identifying information from an external accessory, which may be used to determine a mounting or support configuration. For example, the communication port 1328 may be used to determine that the device 1300 is coupled to a support accessory, such as a particular type of stand or support structure. In accordance with some embodiments, this determination may be used to define a dynamic force threshold for the device 1300.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for dynamically adjusting a minimum amount of force required to be registered by a force sensor that is coupled to a touch-sensitive surface in an electronic device to maintain the electronic device in a stable orientation on a supporting surface when a user touches the touch-sensitive surface, the method comprising:
   using a processor, determining a first angle of the touch-sensitive surface relative to the supporting surface based on data from at least one sensor;
   using the processor, dynamically adjusting the minimum amount of force required to be registered by the force sensor for at least a portion of the touch-sensitive surface based on the first angle;
   using the processor, determining a second angle of the touch-sensitive surface relative to the supporting surface based on data from the at least one sensor;
   using the processor, dynamically adjusting the minimum amount of force to be registered by the force sensor for at least a portion of the touch-sensitive surface based on the second angle; and
   using the processor, initiating a press-event signal in response to receiving a touch on the touch-sensitive surface that exceeds the minimum amount of force to be registered by the force sensor.

2. The method of claim 1, further comprising:
   using the processor, detecting a change in an angle of the touch-sensitive surface relative to the supporting surface based on data from the at least one sensor; and
   using the processor, adjusting the minimum amount of force required to be registered by the force sensor for the portion of the touch-sensitive surface based on the detected change in the angle of the touch-sensitive surface.

3. The method of claim 1, further comprising:
   using the processor, detecting a movement of the electronic device in response to the touch on the touch-sensitive surface based on data from an additional sensor; and
   in response to detecting the movement, reducing the minimum amount of force required to be registered by the force sensor for the touch-sensitive surface.

4. The method of claim 1, further comprising:
   using the processor, determining an angle of the touch-sensitive surface relative to the supporting surface based on data from the at least one sensor;
   using the processor, determining a material of the supporting surface based on data gathered by an optical sensor;
   using the processor, calculating a friction between the electronic device and the supporting surface based on the material of the supporting surface;
   using the processor, calculating a static breaking torque of a pivot joint that is configured to hold the touch-sensitive surface at a fixed orientation; and using the processor, calculating an amount of force that will cause the electronic device to tip based on the angle of the touch-sensitive surface, the friction, and the static breaking torque.

5. An electronic device on a supporting surface and configured to receive a touch input from a user, the electronic device comprising:
a touch sensitive surface;
a force sensor that measures an amount of force applied to the touch-sensitive surface by the touch; and
a processing unit that determines an angle stability of the touch-sensitive surface with respect to the supporting surface using data from at least one sensor, dynamically adjusts a minimum amount of force required to be registered by the force sensor for the touch-sensitive surface based on the angle of the touch-sensitive surface, and initiates a signal in response to the touch input on the touch-sensitive surface that has a force greater than the minimum amount of force.

6. The electronic device of claim 5, wherein the minimum amount of force required to be registered by the force sensor is a first region-specific minimum force,
wherein the processing unit dynamically adjusts a second region-specific minimum amount of force required to be registered by the force sensor for a second region of the touch-sensitive surface, and wherein the second region-specific minimum force is different than the first region-specific minimum force.

7. The electronic device of claim 6, wherein the processing unit further initiates a first signal in response to the touch being located in the first region and exceeding the first region-specific minimum force, and initiates a second signal in response to the touch being located in the second region and exceeding the second region-specific minimum force.

8. The electronic device of claim 6, wherein the minimum amount of force required to be registered by the force sensor is based, at least in part, on a distance between the location of the touch and a location of a pivot point and the first region is further from the pivot point than the second region.

9. The electronic device of claim 8, wherein the first region-specific minimum force is less than the second region-specific minimum force.

10. The electronic device of claim 5, wherein the minimum amount of force required to be registered by the force sensor is dynamically updated based on a change in the angle of the touch-sensitive surface with respect to the supporting surface.

11. The electronic device of claim 5, wherein the processing unit further detects movement due to the touch on the touch-sensitive surface of the electronic device, and reduces the minimum amount of force required to be registered by the force sensor in response to the detected movement.

12. The electronic device of claim 5, further comprising:
an optical sensor, wherein the processing unit uses data from the optical sensor to determine at least one material of the supporting surface and wherein the processing unit calculates a friction between the electronic device and the supporting surface based on the at least one material.

13. The electronic device of claim 5, wherein the electronic device is configured to attach to a support accessory configured to support the electronic device, the electronic device further comprises a proximity sensor that the processing unit uses to detect a presence of the support accessory, and the processing unit dynamically adjusts the minimum amount of force required to be registered by the force sensor for the touch-sensitive surface based on the presence of the support accessory.

14. The electronic device of claim 5,
wherein the at least one sensor includes one or more of:
an accelerometer, an inclinometer, a gyrometer, or a magnetometer.

15. An electronic device configured to receive a touch from a user, the electronic device comprising:
an enclosure that attaches to a support structure, the support structure having a hinge about which the enclosure pivots;
a touch-sensitive surface coupled to the enclosure, the touch-sensitive surface having a first portion that is a first distance from the hinge and a second portion that is a second distance from the hinge;
a force sensor that measures an amount of a force applied to a touch-sensitive surface; and
a processing unit that adjusts a first minimum amount of force required to be registered by the force sensor at the first portion of the touch-sensitive surface based on the first distance, that adjusts a second minimum amount of force required to be registered by the force sensor at the second portion of the touch-sensitive surface based on the second distance, that initiates a first touch signal in response to receiving a first touch in the first portion of the touch-sensitive surface that exceeds the first minimum amount of force, and that initiates a second touch signal in response to receiving a second touch in the second portion of the touch-sensitive that exceeds the second minimum amount of force.

16. The electronic device of claim 15, wherein the electronic device rotates about the hinge when a torque exceeds a static threshold and when the touch from the user is below the first and second minimum amounts of force, the touch will not cause the electronic device to rotate about the hinge.

17. The electronic device of claim 15, wherein the support structure is supported by a surface of an external object, the electronic device further comprises an optical sensor, the processing unit determines at least one material of the surface of the external object based on data from the optical sensor, the processing unit determines an amount of friction between the support structure and the surface based on the at least one material, and the first and second minimum amounts of force are based, at least in part, on an the amount of friction.

18. The electronic device of claim 16, wherein the hinge is a ball-joint that rotates about multiple axes, and the first and second minimum amounts of force vary across both a length of the touch-sensitive surface and a width of the touch-sensitive surface.

* * * * *

UNITED STATES PATENT AND TRADEMARK OFFICE
CERTIFICATE OF CORRECTION

PATENT NO.         : 10,180,755 B2                                    Page 1 of 1
APPLICATION NO.    : 15/056679
DATED              : January 15, 2019
INVENTOR(S)        : Matthew D. Hill et al.

It is certified that error appears in the above-identified patent and that said Letters Patent is hereby corrected as shown below:

In the Claims

Column 28, Line 53, "on an the amount" should read -- on the amount --

Signed and Sealed this
Twelfth Day of November, 2019

Andrei Iancu
*Director of the United States Patent and Trademark Office*